(12) United States Patent
Fukaura et al.

(10) Patent No.: US 11,787,358 B2
(45) Date of Patent: Oct. 17, 2023

(54) OCCUPANT PROTECTION DEVICE

(71) Applicant: TOYODA GOSEI CO., LTD., Kiyosu (JP)

(72) Inventors: Kazumi Fukaura, Kiyosu (JP); Yasushi Masuda, Kiyosu (JP); Shinji Yamada, Nagoya (JP); Sanae Oritaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/692,259

(22) Filed: Mar. 11, 2022

(65) Prior Publication Data

US 2022/0306033 A1  Sep. 29, 2022

(30) Foreign Application Priority Data

Mar. 25, 2021 (JP) .................................. 2021-052344
Sep. 29, 2021 (JP) .................................. 2021-159075

(51) Int. Cl.
*B60R 21/20* (2011.01)
(52) U.S. Cl.
CPC .................................. *B60R 21/20* (2013.01)
(58) Field of Classification Search
CPC .................................................... B60R 21/18
See application file for complete search history.

(56) References Cited

U.S. PATENT DOCUMENTS

| | | | |
|---|---|---|---|
| 10,933,830 B2 * | 3/2021 | Einarsson | ............. B60R 21/261 |
| 11,318,904 B2 * | 5/2022 | Ozaki | ...................... B60R 22/26 |
| 2015/0069741 A1 | 3/2015 | Shimazu | |
| 2021/0094504 A1 * | 4/2021 | Tanaka | ............. B60R 21/23138 |

FOREIGN PATENT DOCUMENTS

| | | | | |
|---|---|---|---|---|
| CN | 100376434 C | * | 3/2008 | ............. B60R 21/18 |
| CN | 110239473 A | * | 9/2019 | |
| DE | 102020207208 B3 | * | 4/2021 | |
| JP | 2015-51744 A | | 3/2015 | |

* cited by examiner

*Primary Examiner* — Faye M Fleming
(74) *Attorney, Agent, or Firm* — POSZ LAW GROUP, PLC

(57) ABSTRACT

There is provided an occupant protection device for protecting an occupant seated on a seat, including: an airbag folded and accommodated in a bag shape made of a flexible sheet material; and a holding belt portion that is wrapped around a hip of the occupant and holds the folded airbag. The airbag is configured to, when the airbag is activated, allow an inflation gas to flow thereinto, and inflate to protrude forward and upward from the holding belt portion, and includes an upper body restraining surface capable of restraining an upper body of the occupant, on a rear surface side, when inflation is completed, and a vehicle body side member abutting surface that abuts against a vehicle body side member provided in front of the seat to be capable of ensuring a reaction force of the airbag when the occupant is restrained, on a front surface side.

14 Claims, 20 Drawing Sheets

FIG. 3
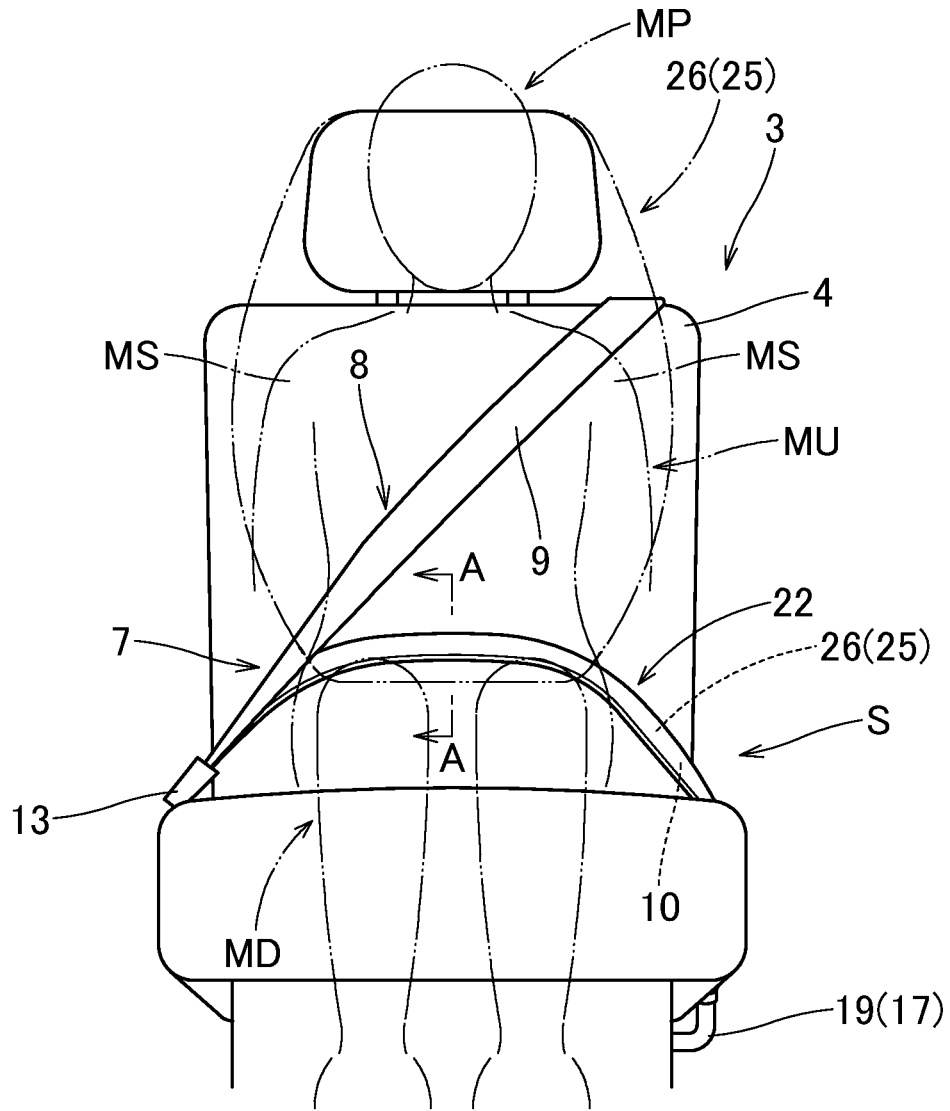
Schematic Sectional View at A-A
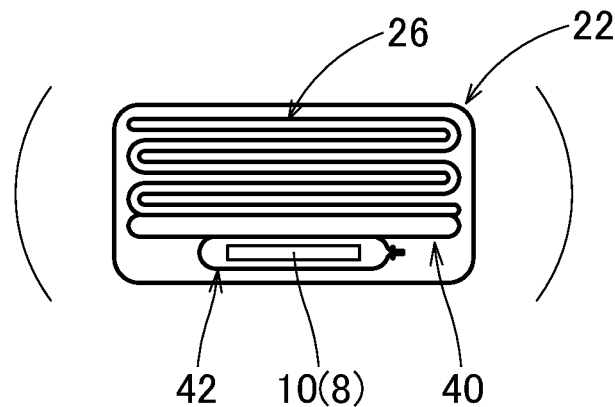

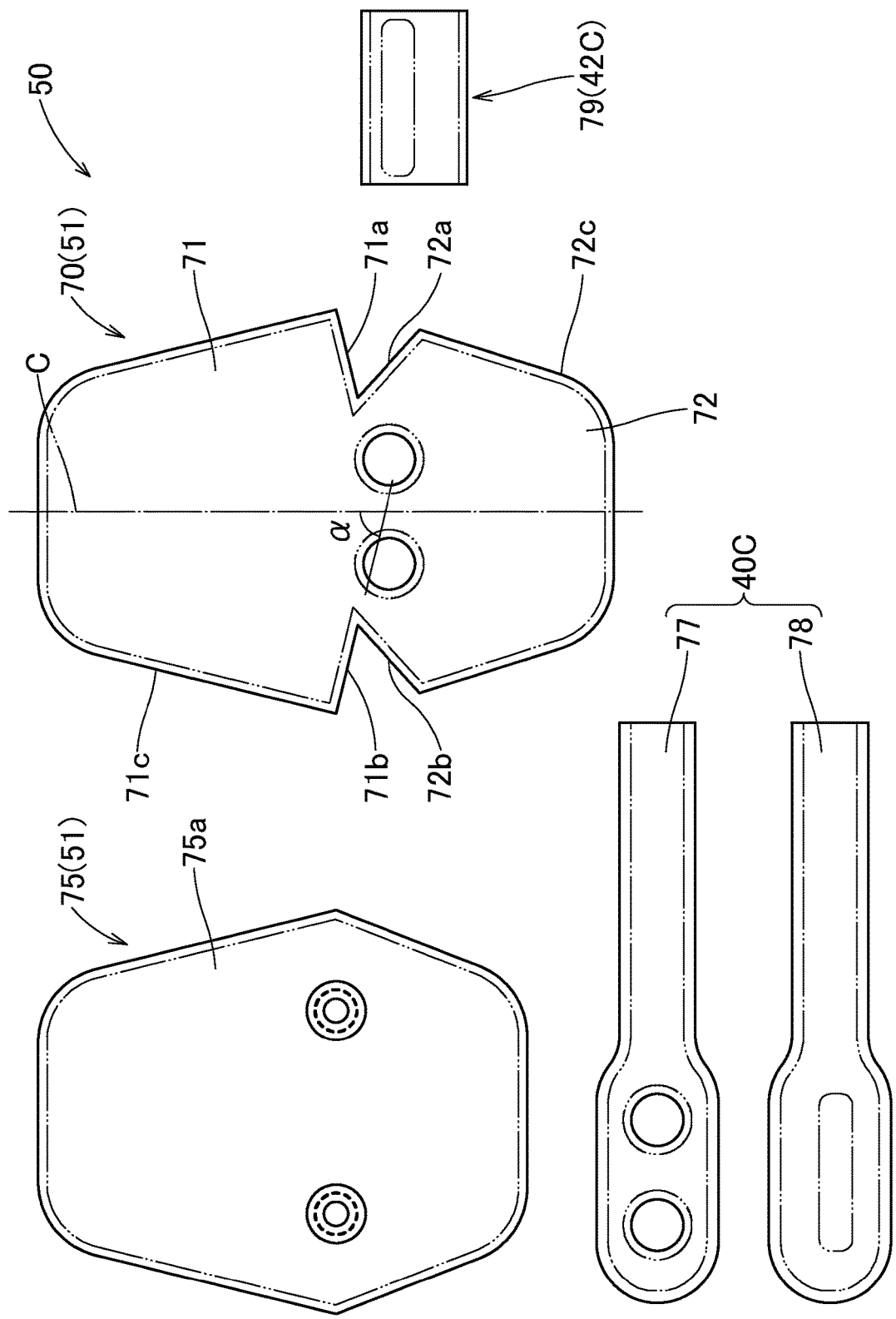

OCCUPANT PROTECTION DEVICE

CROSS REFERENCE TO RELATED APPLICATIONS

The present application claims priority from Japanese Patent Application No. 2021-52344 of Fukaura et al., filed on Mar. 25, 2021, and Japanese Patent Application No. 2021-159075 of Fukaura et al., filed on Sep. 29, 2021, the entire disclosures of which are incorporated herein by reference.

BACKGROUND

1. Technical Field

The present disclosure relates to an occupant protection device for protecting an occupant seated on a seat.

2. Description of Related Art

In the related art, as an occupant protection device, as described in JP-A-2015-51744, there is a device including an airbag accommodated at a part of a wrap belt wrapped around a hip in a seat belt. In this occupant protection device, the occupant seated on the seat is protected by an airbag inflated to protrude forward and upward.

In the occupant protection device of the related art, the upper body of the occupant seated on the seat can be protected by the airbag, but contact between the vehicle body side member provided in front of the seat and the occupant is not taken into consideration. Therefore, there is room for improvement in suppressing the contact between the occupant moving forward and the vehicle body side member when an impact force from the front is strongly applied.

SUMMARY

The present disclosure relates to an occupant protection device having the following configuration.

According to an aspect of the present disclosure, there is provided an occupant protection device for protecting an occupant seated on a seat, including: an airbag folded and accommodated in a bag shape made of a flexible sheet material; and a holding belt portion that is wrapped around a hip of the occupant and holds the folded airbag, in which the airbag is configured to, when the airbag is activated, allow an inflation gas to flow thereinto, and inflate to protrude forward and upward from the holding belt portion, and includes an upper body restraining surface capable of restraining an upper body of the occupant, on a rear surface side, when inflation is completed, and a vehicle body side member abutting surface that abuts against a vehicle body side member provided in front of the seat to be capable of ensuring a reaction force of the airbag when the occupant is restrained, on a front surface side.

BRIEF DESCRIPTION OF DRAWINGS

FIG. 3 is a front view of the seat of FIG. 1 and illustrates a state where a seat belt is fastened.

FIG. 13 is a plan view of a state where base members that form the airbag of FIG. 11 are arranged side by side.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Hereinafter, one embodiment of the present disclosure will be described based on the drawings. In the embodiment, the front-rear, up-down, and left-right directions are identical to the front-rear, up-down, and left-right directions of a seat 3.

Figure 1:
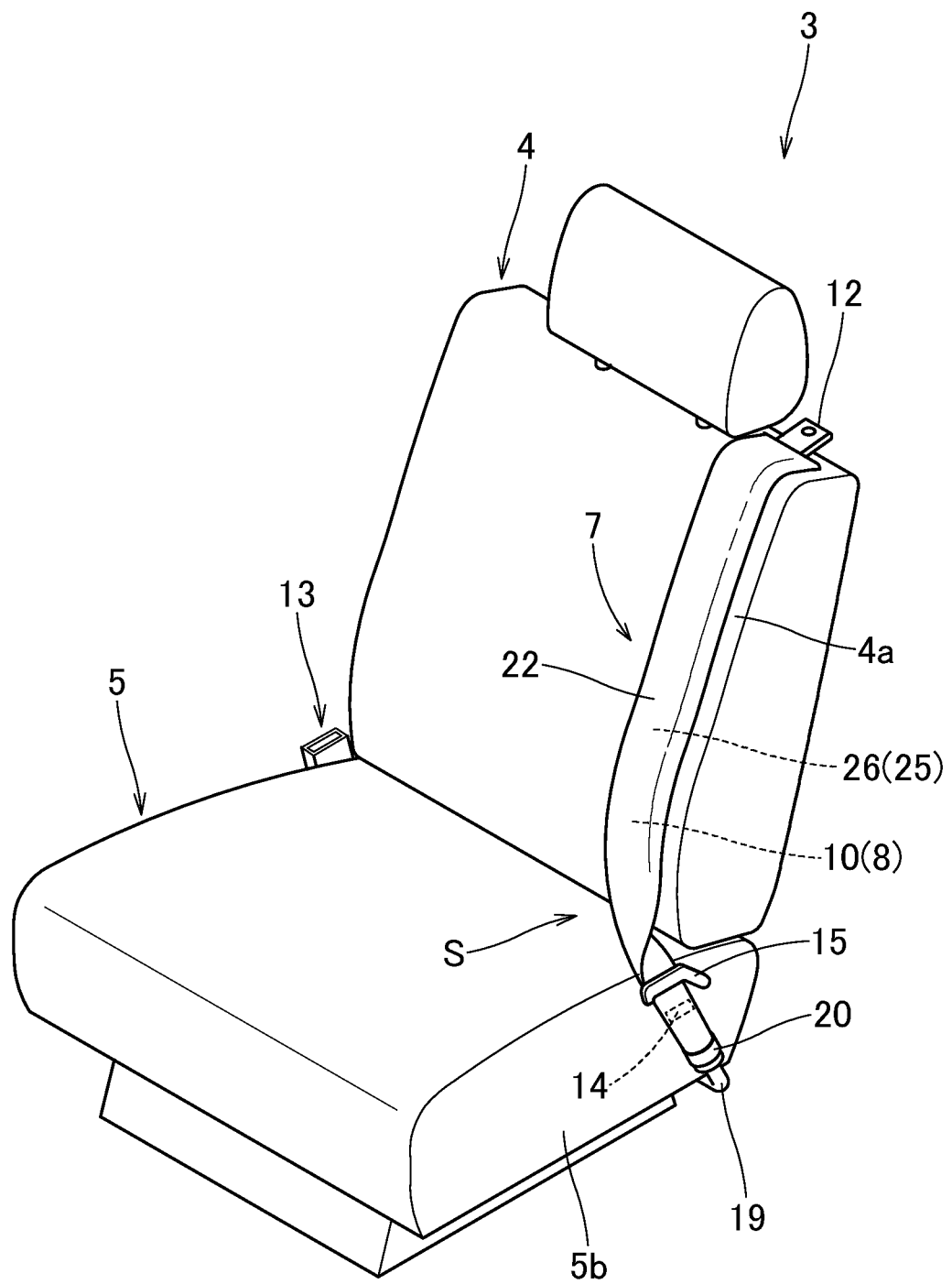
FIG. 1 is a perspective view of a seat in which an occupant protection device according to an embodiment of the present disclosure is installed.
Figure 2:
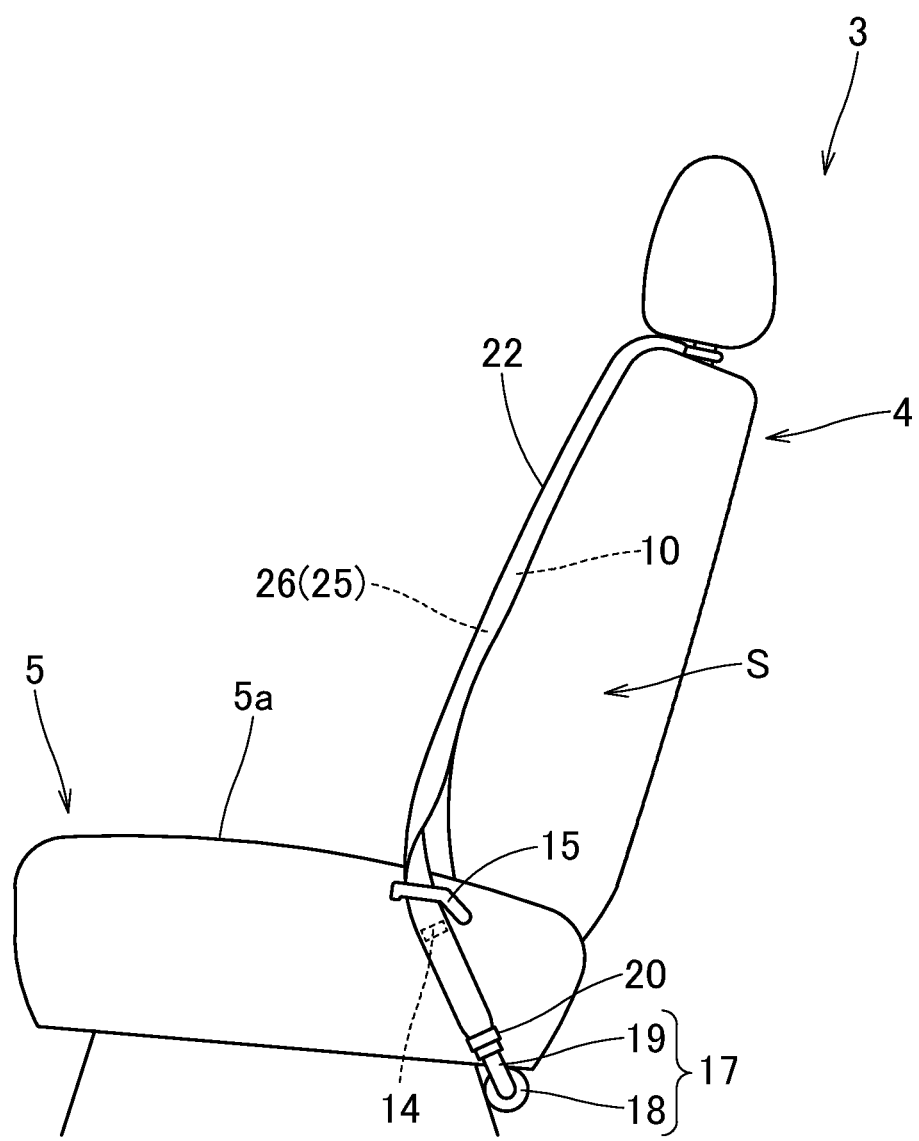
FIG. 2 is a side view of the seat of FIG. 1.
Figure 6:
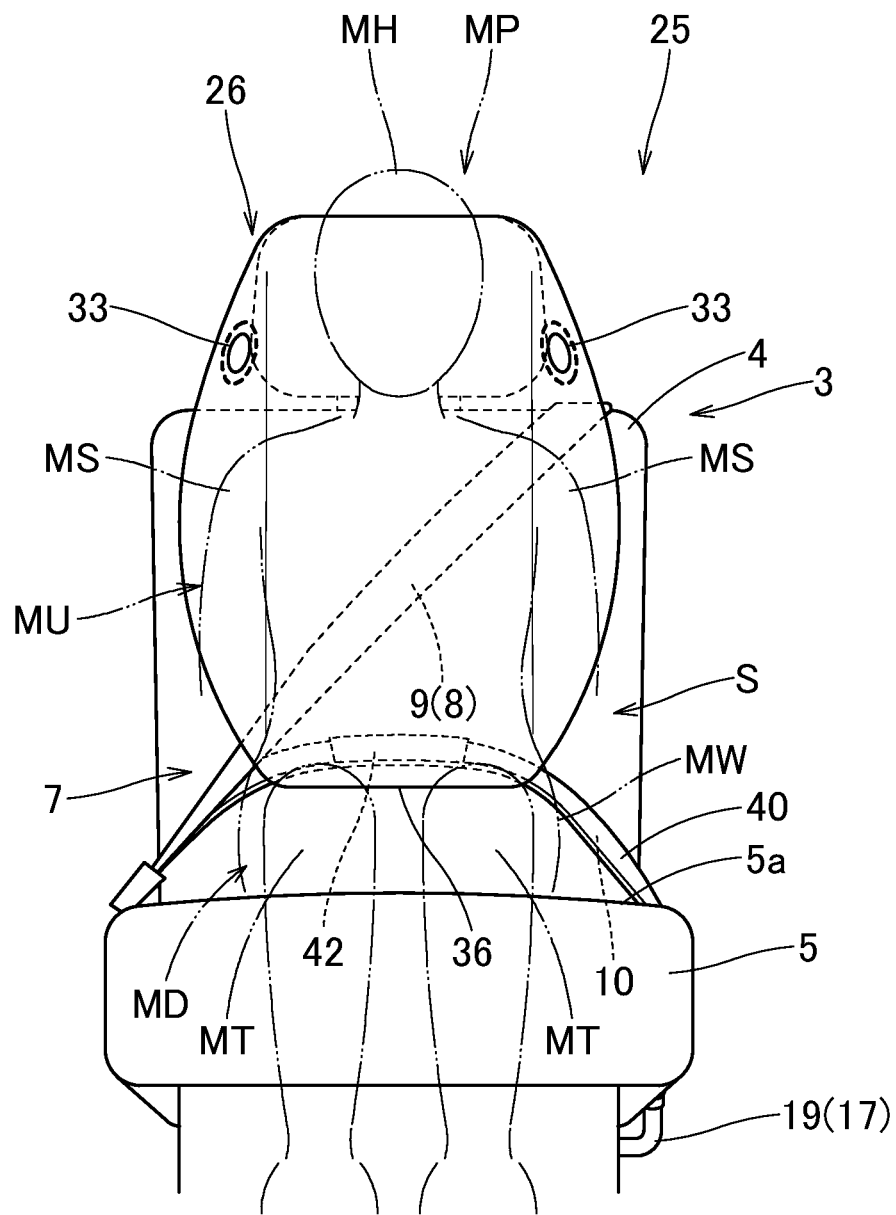
FIG. 6 is a front view of the seat in a state where inflation of the airbag is completed in the occupant protection device of the embodiment.

As illustrated in FIG. 6, an occupant protection device S of the embodiment is installed at the seat 3. In front of the seat 3, there is installed an instrument panel 1 as a vehicle body side member. That is, the seat 3 is a passenger seat. As illustrated in FIGS. 1 and 2, the occupant protection device S includes a seat belt 7 as a holding belt portion for holding the airbag 25, an airbag 25, and an inflator 17 for supplying an inflation gas to the airbag 25. The seat 3 (passenger seat) includes a backrest portion 4 and a seat portion 5. In the instrument panel 1 of a vehicle in which the seat 3 having the occupant protection device S of the embodiment installed therein is used as a passenger seat, an airbag device for a passenger seat, which is installed in a normal vehicle, is not installed.

The seat belt 7 includes a belt main body 8 for restraining an occupant MP seated on the seat 3, a tongue plate 12 attached to the belt main body 8, and a buckle 13 for coupling the tongue plate 12. One end of the belt main body 8 is locked to a winding shaft of a retractor (not illustrated) disposed in the backrest portion 4, and the other end is locked to an anchor member 14 (refer to FIGS. 1 and 2) disposed on the left of the rear end of the seat portion 5 in the seat 3. Specifically, the belt main body 8 is disposed to be exposed to the outside from the upper end left edge side of the backrest portion 4. In the case of the embodiment, a wrap belt 10 is exposed on the front surface of the backrest portion 4 as illustrated in FIGS. 1 and 2 in the non-sitting state of the occupant. The belt main body 8 includes the wrap belt 10 and a shoulder belt 9 accommodated in the backrest portion 4. Then, the seat belt 7 restrains a lower body MD (hip MW) of the occupant MP by the wrap belt 10 disposed to be substantially along the left-right direction between the anchor member 14 and the buckle 13, and restrains an upper body MU (from a shoulder MS to a chest MB) of the occupant MP by the shoulder belt 9 which is diagonally disposed extending from the upper end left edge side of the backrest portion 4 to the buckle 13, in a state where the tongue plate 12 is coupled to the buckle 13 when the occupant is seated. In other words, in the occupant protection device S of the embodiment, the wrap belt 10 forms the holding belt portion which is wrapped around the hip MW of the occupant MP and holds the folded airbag 25. As illustrated in FIG. 1, the wrap belt 10 is exposed to the front surface of the backrest portion 4 to be substantially along the up-down direction on a left edge 4a side of the backrest portion 4 in the non-sitting state of the occupant MR In the seat belt 7, the retractor (not illustrated) disposed in the backrest portion 4 has a pretensioner mechanism.

The inflator 17 is provided on the rear lower side of the seat portion 5 in the seat 3. In the case of the embodiment, as illustrated in FIG. 1, the inflator 17 includes an inflator main body 18 (the detailed illustration is omitted) and a pipe portion 19 extending from the inflator main body 18 and supplying an inflation gas to the airbag 25. The pipe portion 19 extends from the inflator main body 18 and is provided such that the tip end thereof is positioned on the left of the seat 3 in the vicinity of the boundary part between the seat portion 5 and the backrest portion 4. The tip end of the pipe portion 19 is connected to a conduit portion 40 (which will be described later) in the airbag 25 by using a clamp 20 (refer to FIG. 7). In the case of the embodiment, the inflator 17 is set such that the start of actuation is delayed more than the actuation of the pretensioner mechanism of the seat belt 7 in order to restrict the withdrawal of the belt main body 8 of the seat belt 7 due to the inflation of the airbag 25. Specifically, the inflator 17 is set to be actuated in 5 ms after the actuation of the pretensioner mechanism of the seat belt 7.

Figure 4:
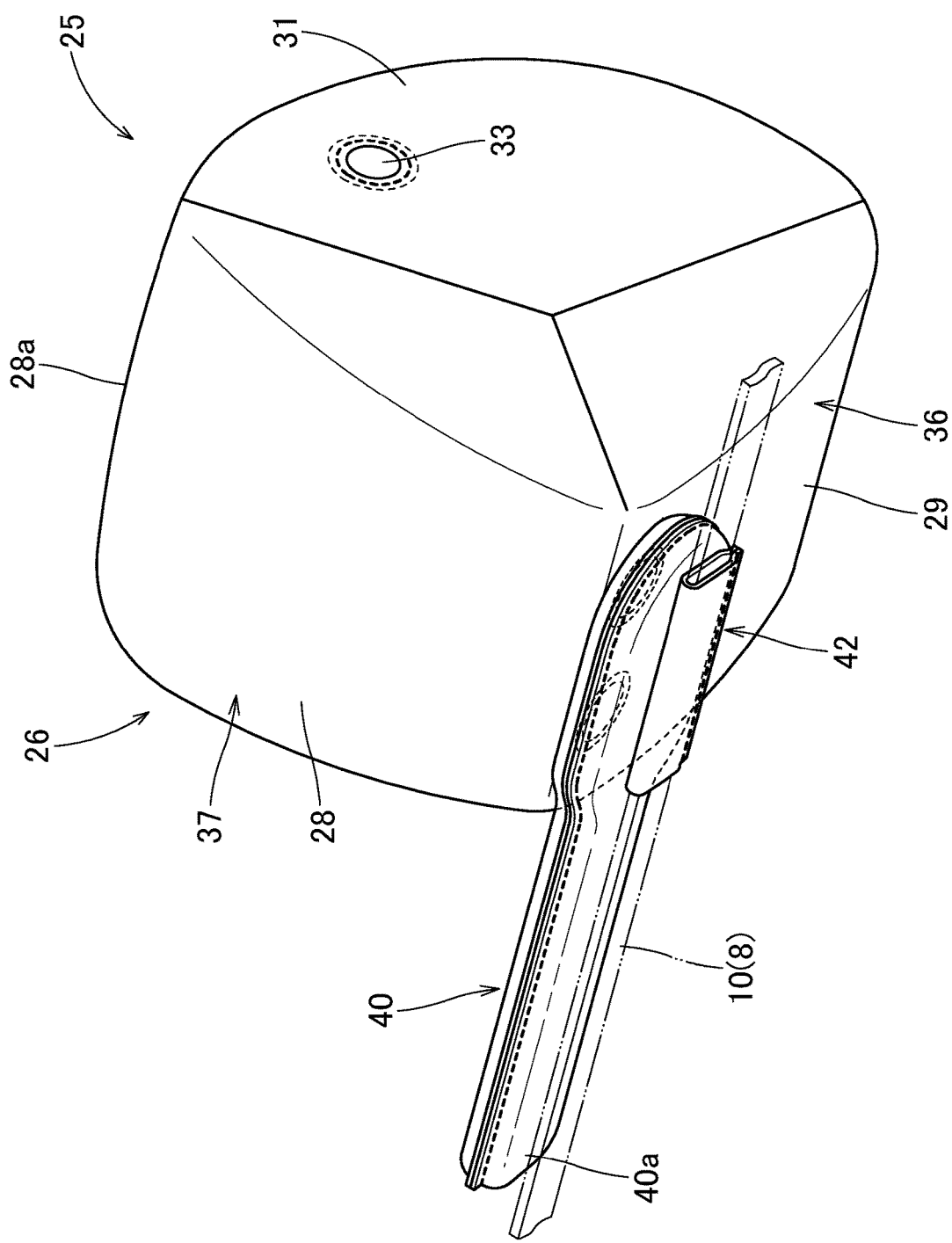
FIG. 4 is a schematic perspective view illustrating a state where an airbag used in the occupant protection device of FIG. 1 is inflated singly.
Figure 5:
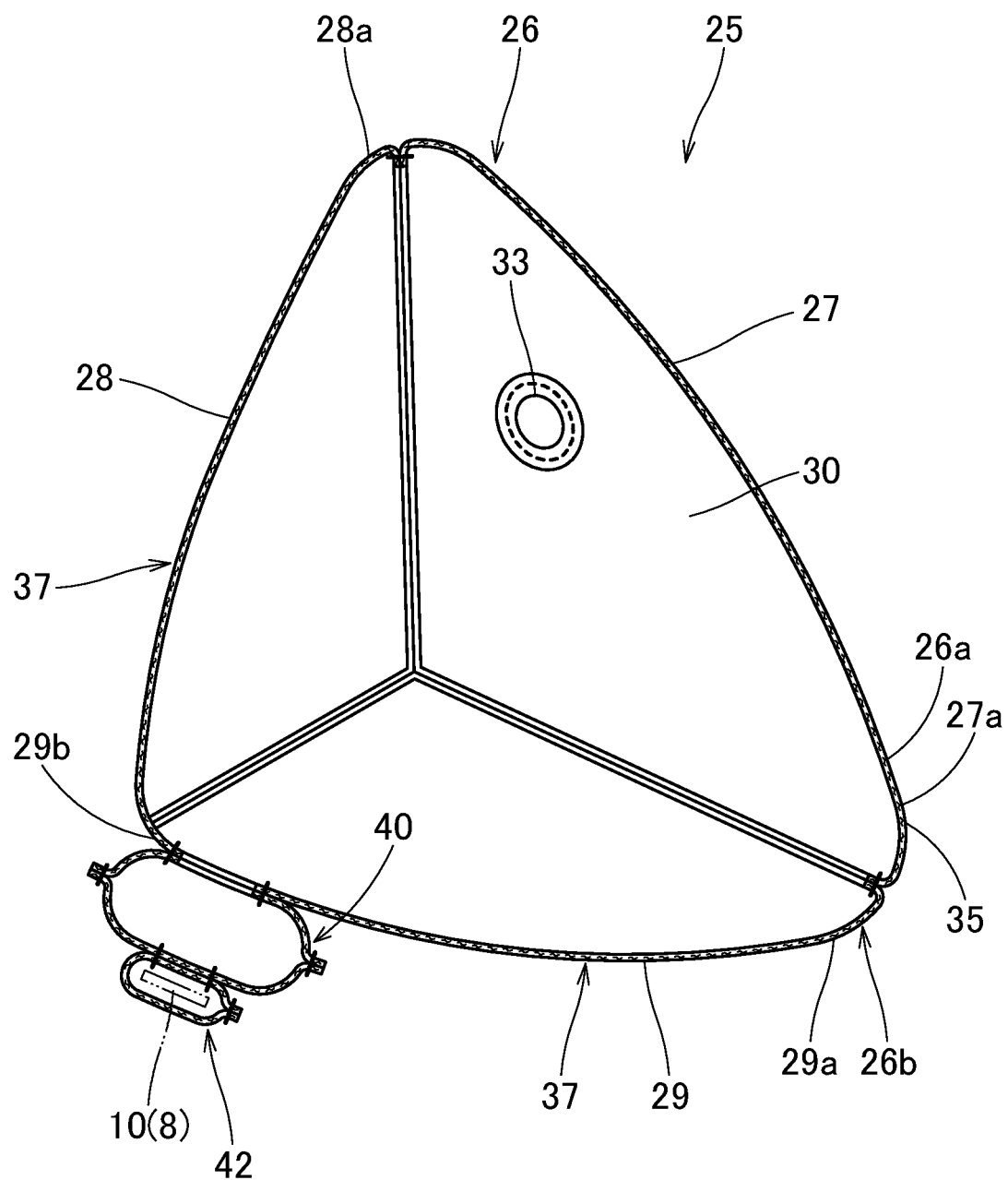
FIG. 5 is a schematic vertical sectional view of the airbag of FIG. 4.

The airbag 25 has a bag shape made of a flexible sheet material, and as illustrated in FIGS. 4 and 5, the airbag 25 includes the bag main body 26, the conduit portion 40 which is connected to the inflator 17 and allows the inflation gas to flow into the bag main body 26, and a belt attaching portion 42 for coupling the bag main body 26 to the wrap belt 10. In the case of the embodiment, the airbag 25 is made of a flexible woven fabric made of polyester yarn, polyamide yarn, or the like. Further, the airbag 25 is disposed in the region of the wrap belt 10 such that the bag main body 26 is folded into a long shape and is overlapped with the upper surface side of the wrap belt 10 when the seat belt 7 is fastened (refer to FIG. 3). In other words, the airbag 25 is held by the wrap belt 10 with the wrap belt 10 as the holding belt portion. In the non-fastening state as illustrated in FIGS. 1 and 2, the airbag 25 (the folded bag main body 26 and the conduit portion 40) is disposed on the rear surface side (backrest portion 4 side) of the wrap belt 10. In the case of the embodiment, the folded airbag 25 and the wrap belt 10 are integrated while covering the surrounding with a cover 22 which can be broken when the airbag 25 is expanded and inflated, as illustrated in FIG. 3.

Figure 7:
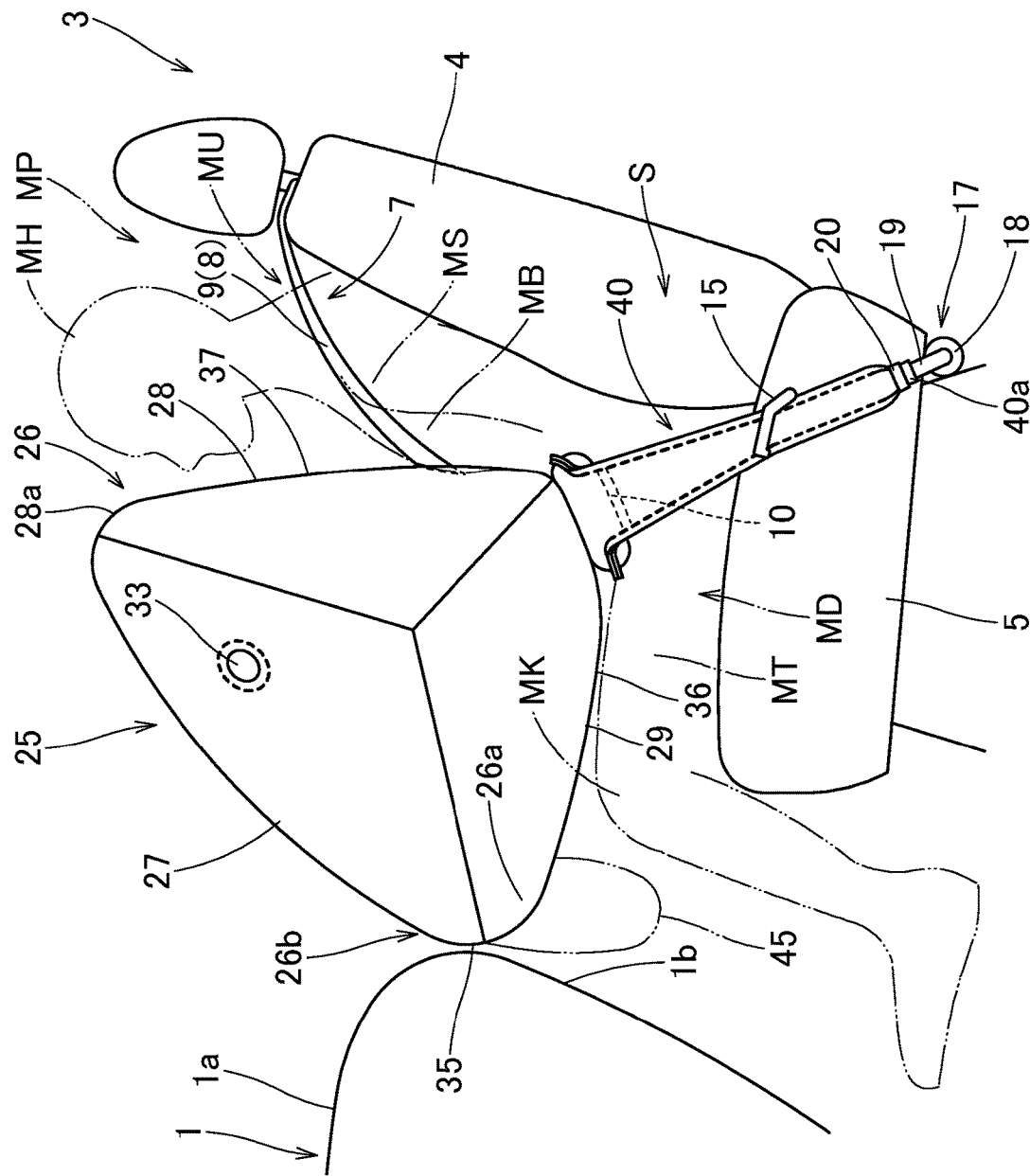
FIG. 7 is a side view of the seat in a state where inflation of the airbag is completed in the occupant protection device of the embodiment.
Figure 8:
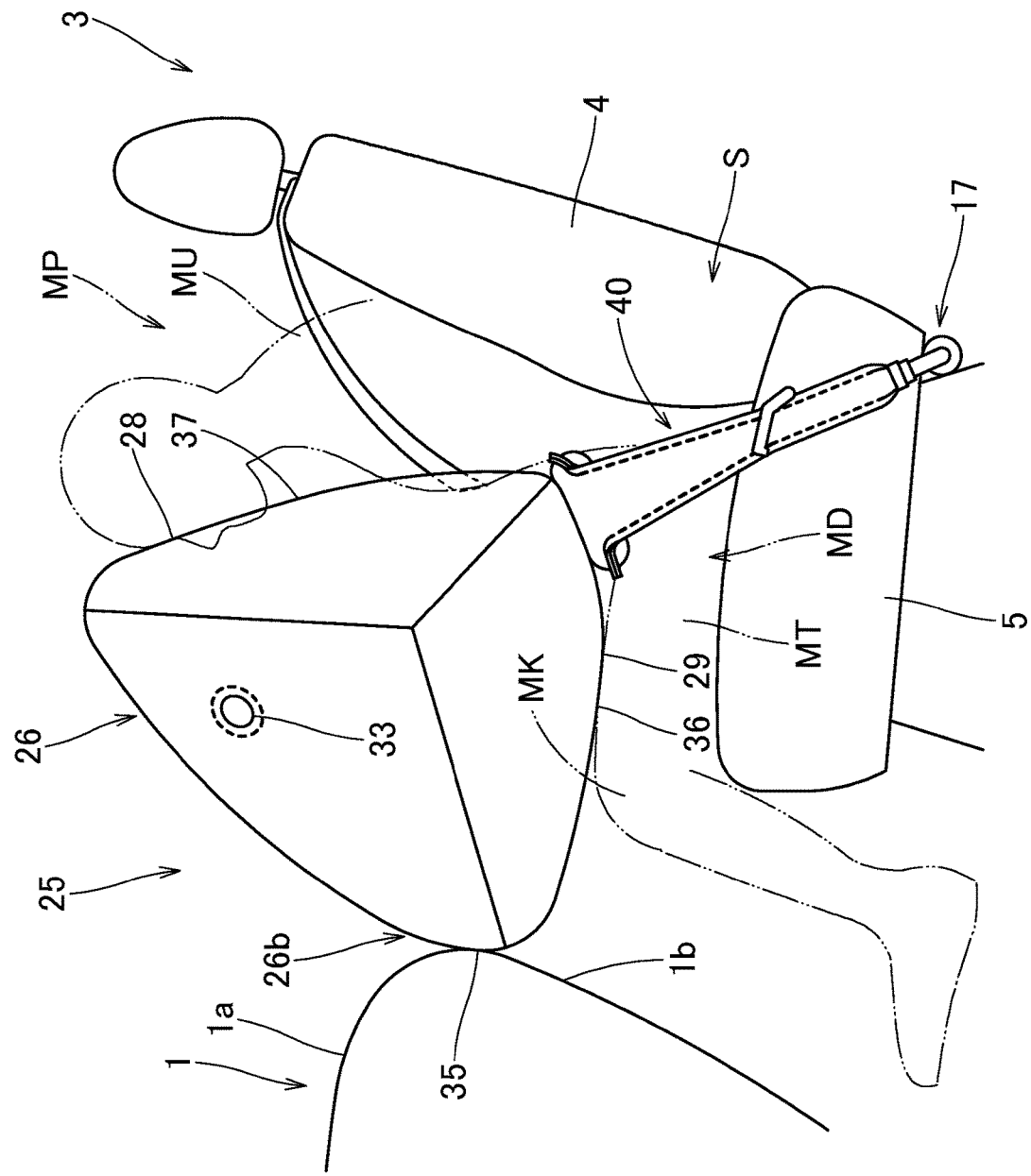
FIG. 8 is a side view illustrating a state where an occupant is restrained by the airbag that completed inflation in the occupant protection device of the embodiment.

In the case of the embodiment, the external shape of the bag main body 26 when inflation is completed is a substantially triangular prism shape in which the axial direction is substantially along the left-right direction, as illustrated in FIGS. 4 and 5. To be described in detail, in the bag main body 26, the inflation completed shape in a state of being viewed from the left and right is a substantially right-angled triangular shape having an inclined side on the front side, and the inflation completed shape in a state of being viewed in the front-rear direction is a substantially rectangular shape that is wide in the up-down direction (refer to FIGS. 6 and 7). The bag main body 26 has a front wall 27 disposed on the front side (vehicle body side member side, that is, the instrument panel 1 side) away from the occupant MP when inflation is completed, a rear wall 28 and a lower wall 29 which are arranged on the occupant MP side when inflation is completed, and a left wall 30 and a right wall 31 which are arranged to face each other in the left-right direction when inflation is completed (refer to FIGS. 4 and 5). In the bag main body 26 (airbag 25) of the embodiment, a part of the front wall 27 on a lower end 27a side forms a vehicle body side member abutting surface 35. The lower end 27a is disposed to face a rear surface 1b of the instrument panel 1 in the front-rear direction. And, when the occupant is restrained, the lower end 27a of the front wall 27 (the body side member abutting surface 35) can abut against the instrument panel 1. In other words, the vehicle body side member abutting surface 35 is provided on the lower end 26a side of the bag main body 26 (airbag 25) when inflation is completed. Further, in the bag main body 26 (airbag 25) of the embodiment, the lower wall 29 forms a femur abutting surface 36 capable of abutting against a femoral region MT of the occupant MP when inflation is completed, and the rear wall 28 forms an upper body restraining surface 37 capable of restraining the upper body MU (from the chest MB to a head MH) of the occupant MP when inflation is completed. Specifically, the bag main body 26 is formed such that the width dimension in the left-right direction when inflation is completed is smaller than the backrest portion 4 of the seat 3 and equivalent to the upper body MU to be capable of stably protecting the upper body MU of the occupant MP (refer to FIG. 6). The rear wall 28 and the lower wall 29 are arranged to be substantially orthogonal to each other. The front wall 27 is disposed to be inclined when viewed from the left and right sides such that the lower end 27a side is positioned on the front side. The width dimension of the bag main body 26 in the front-rear direction when inflation is completed is set such that a front lower end part 26b, which is on the front lower end side when inflation is completed, is positioned in front of a knee MK of the occupant MP. (refer to FIG. 7). Specifically, the width dimension of the bag main body 26 in the front-rear direction is set to be a dimension that positions the front lower end part 26b in front of the knee MK and makes the vehicle body side member abutting surface 35 formed of the front surface (the lower end 27a of the front wall 27) of the front lower end part 26b abut against the instrument panel 1 at a position in front of the knee MK, as illustrated in FIG. 8, in a state where the upper body MU of the occupant MP moving diagonally forward is restrained by the upper body restraining surface 37 of the bag main body 26 that completed inflation. Further, in the embodiment, the airbag 25 (bag main body 26) in the occupant non-receiving state is disposed to provide a gap between the front lower end part 26b and the instrument panel 1 in a state where inflation is completed. (refer to FIG. 7). In other words, the lower wall 29 (femur abutting surface 36) positions a front end 29a in front of the knee MK of the occupant MP and cover the upper surface of the femoral region MT over substantially the entire surface in the front-rear and left-right directions. The upper end 28a of the rear wall 28 (upper body restraining surface 37) is disposed at a position in front of the head MH of the occupant MP.

Further, the bag main body 26 includes two vent holes 33 capable of exhausting the excess inflation gas that has flowed thereinto. The vent holes 33 are formed in the bag main body 26 at a position of a non-contact area when abutting against the instrument panel 1 when inflation is completed. Specifically, the vent holes 33 are formed at a position above the upper surface 1a of the instrument panel 1 and at a position equal to or higher than the height of the shoulder MS of the occupant MP in the bag main body 26 when inflation is completed. In the case of the embodiment, the vent holes 33 are provided in the vicinity of the front upper end of the left wall 30 and the right wall 31 on the side surface side of the airbag 25 (bag main body 26) when inflation is completed (refer to FIGS. 6 and 7). Further, the bag main body 26 communicates with the conduit portion 40 at a part (a part on the rear end 29b side of the lower wall 29) on the rear lower end side when inflation is completed via communication holes (numeral is omitted in the drawing) (refer to FIG. 5).

The conduit portion 40 extends to the left from the bag main body 26, and is connected to the pipe portion 19 of the inflator 17. The conduit portion 40 has a substantially cylindrical shape and having an opening on a tip end 40a side. When the inflation of the airbag 25 is completed, the conduit portion 40 is disposed substantially along the left-right direction to be substantially along the wrap belt 10. The conduit portion 40 is formed such that the tip end 40a side is connected to the pipe portion 19 of the inflator 17 by using a clamp 20 as described above. As illustrated in FIGS. 4 and 5, the belt attaching portion 42 for coupling the bag main body 26 to the wrap belt 10 is provided on the lower surface side of the conduit portion 40. The belt attaching portion 42 has a substantially cylindrical shape with both ends open such that the wrap belt 10 can be inserted.

In the occupant protection device S of the embodiment, when the inflator 17 is actuated in a state of being installed on the vehicle, the inflation gas discharged from the inflator 17 flows into the bag main body 26 via the conduit portion 40. Then, the bag main body 26 protrudes forward and upward from the wrap belt 10 as the holding belt portion to break the cover 22, and completes the inflation as illustrated in FIGS. 6 and 7.

Then, in the occupant protection device S of the embodiment, the airbag 25 (bag main body 26) has the vehicle body side member abutting surface 35 capable of abutting against the instrument panel 1 as a vehicle body side member provided in front of the seat 3. Therefore, even when the occupant MP moves slightly forward with respect to the seat 3 when an impact force is applied to the seat 3 from the front during the actuation, the vehicle body side member abutting surface 35 of the airbag 25 abuts against the rear surface 1b of the instrument panel 1, and contact of the occupant MP with the instrument panel 1 can be suppressed. Further, the airbag 25 can ensure the reaction force when the occupant is restrained by making the vehicle body side member abutting surface 35 abut against the rear surface 1b of the instrument panel 1. Therefore, as illustrated in FIG. 8, when the occupant MP moves such that the upper body MU moves diagonally forward, the forward movement stroke of the upper body restraining surface 37 can be suppressed to increase the energy absorption amount, and the upper body MU of the occupant MP can be stably received and protected by the upper body restraining surface 37.

Therefore, in the occupant protection device S of the embodiment, even when the instrument panel 1 as a vehicle body side member is provided in front of the seat 3, contact with the instrument panel 1 can be suppressed to accurately protect the occupant MP.

In the occupant protection device S of the embodiment, when the impact force from the front is strongly applied, even when the occupant MP comes into contact with the instrument panel 1 as the vehicle body side member after inflation of the airbag 25 is completed, the occupant MP is received by the airbag 25 in a state where the vehicle body side member abutting surface 35 abuts against the instrument panel 1, and the kinetic energy is sufficiently reduced such that there is no problem.

Further, in the occupant protection device S of the embodiment, the airbag 25 (bag main body 26) is formed such that the femur abutting surface 36 that can abut against the femoral region MT of the occupant MP is provided on the lower surface side when inflation is completed. And, the vehicle body side member abutting surface 35 is provided on the lower end 26a side of the airbag 25 (bag main body 26) when inflation is completed, and is capable of abutting against the instrument panel 1 at a position in front of the knee MK of the occupant MR Therefore, in the occupant protection device S of the embodiment, in the airbag 25, the femur abutting surface 36 on the lower surface side can abut against the upper surface of the femoral region MT of the occupant MP when the upper body MU is restrained by the upper body restraining surface 37, and thus the upper body MU of the occupant MP can be more accurately restrained by the upper body restraining surface 37 while the collapse or compression of the airbag 25 is suppressed. Further, in the occupant protection device S of the embodiment, the vehicle body side member abutting surface 35 is capable of abutting against the instrument panel 1 at a position in front of the knee MK of the occupant MP on the lower end 26a side of the airbag 25 (bag main body 26), and thus it is possible to suppress a case where the knee MK of the occupant MP interferes with the instrument panel 1. When the vehicle body side member is not an instrument panel, but is, for example, a seat disposed in front of the seat, as will be described later, and the above-described point is not taken into consideration, for example, the airbag may have a configuration in which the femur abutting surface is not provided on the lower surface side when inflation is completed without providing the vehicle body side member abutting surface on the lower end side of the airbag, as the external shape that protrudes the upper and lower middle parts forward.

Furthermore, a knee protecting portion 45 illustrated by the two-dot chain line in FIG. 7 is provided in the airbag, and when the vehicle body side member abutting surface 35 abuts against the instrument panel 1, the knee protecting portion 45 may cover the front of the knee MK. With such a configuration, it is possible to accurately suppress a case where the knee MK of the occupant MP interferes with the instrument panel 1. As illustrated in FIG. 7, the knee protecting portion 45 may cover the front of the knee in an occupant non-receiving state. Further, the knee protecting portion may cover the front of the knee when the airbag that receives the upper body moving diagonally forward abuts against the instrument panel.

Furthermore, in the occupant protection device S of the embodiment, the vent holes 33 and 33 capable of exhausting the excess inflation gas that has flowed into the airbag 25 are formed at a position of the non-contact area when the airbag 25 (bag main body 26) abuts against the instrument panel 1. Therefore, when the inflated airbag 25 (bag main body 26) makes the vehicle body side member abutting surface 35 abut against the instrument panel 1, the inflation gas is appropriately exhausted from the vent holes 33, and accordingly, it is possible to suppress an excessive increase in internal pressure. It is needless to say that, when such a point is not taken into consideration, the airbag may be formed such that the vent hole is not provided.

Specifically, in the case of the embodiment, the vent holes 33 are provided at a position on the side surface side of the airbag 25 (bag main body 26) when inflation is completed, and at a position equal to or higher than the height (position) of the shoulder MS of the occupant MR In order to exhaust the inflation gas at a position away from the occupant MP, it is preferable to provide the vent holes 33 on the front surface side or the side surface side away from the occupant MP when inflation is completed. In the airbag 25 of the embodiment, the vent holes 33 are disposed on the side surface side (the front upper end sides of the left wall 30 and the right wall 31) at a position equal to or higher than the position (height) of the shoulder portion MS of the occupant MR Therefore, the inflation gas can be reliably exhausted at a position away from the occupant MP, and it is possible to suppress a case where the inflation gas exhausted from the vent holes 33 hits the arm or the like of the occupant. The vent hole may be provided on the side surface side of the airbag as long as the vent hole is at a position equal to or higher than the position of the shoulder of the occupant, but when the vent hole is provided at a position on the lower side of the shoulder, considering the distance to the arm of the occupant, it is desirable to provide the vent hole on the front surface side of the airbag. Further, in the embodiment, the vent holes 33 are provided at a position above the upper surface 1a of the instrument panel 1 in the airbag 25 (bag main body 26) when inflation is completed. Therefore, when the vehicle body side member abutting surface 35 abuts against the instrument panel 1, the bag main body 26 can smoothly exhaust the inflation gas from the vent holes 33 disposed above the instrument panel 1.

Figure 9:
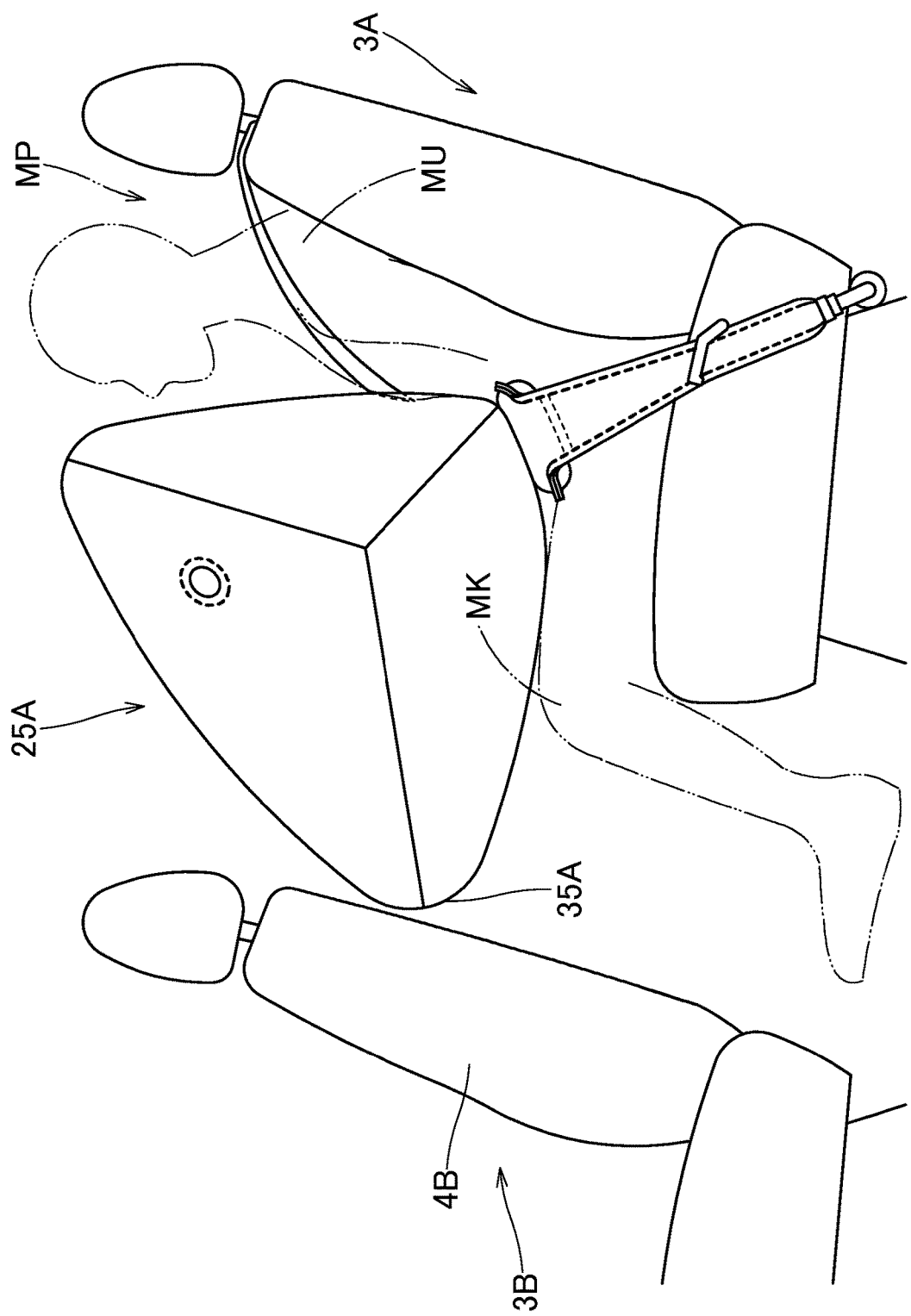
FIG. 9 is a side view of the seat in a state where inflation of the airbag is completed in an occupant protection device according to another embodiment of the present disclosure.
Figure 10:
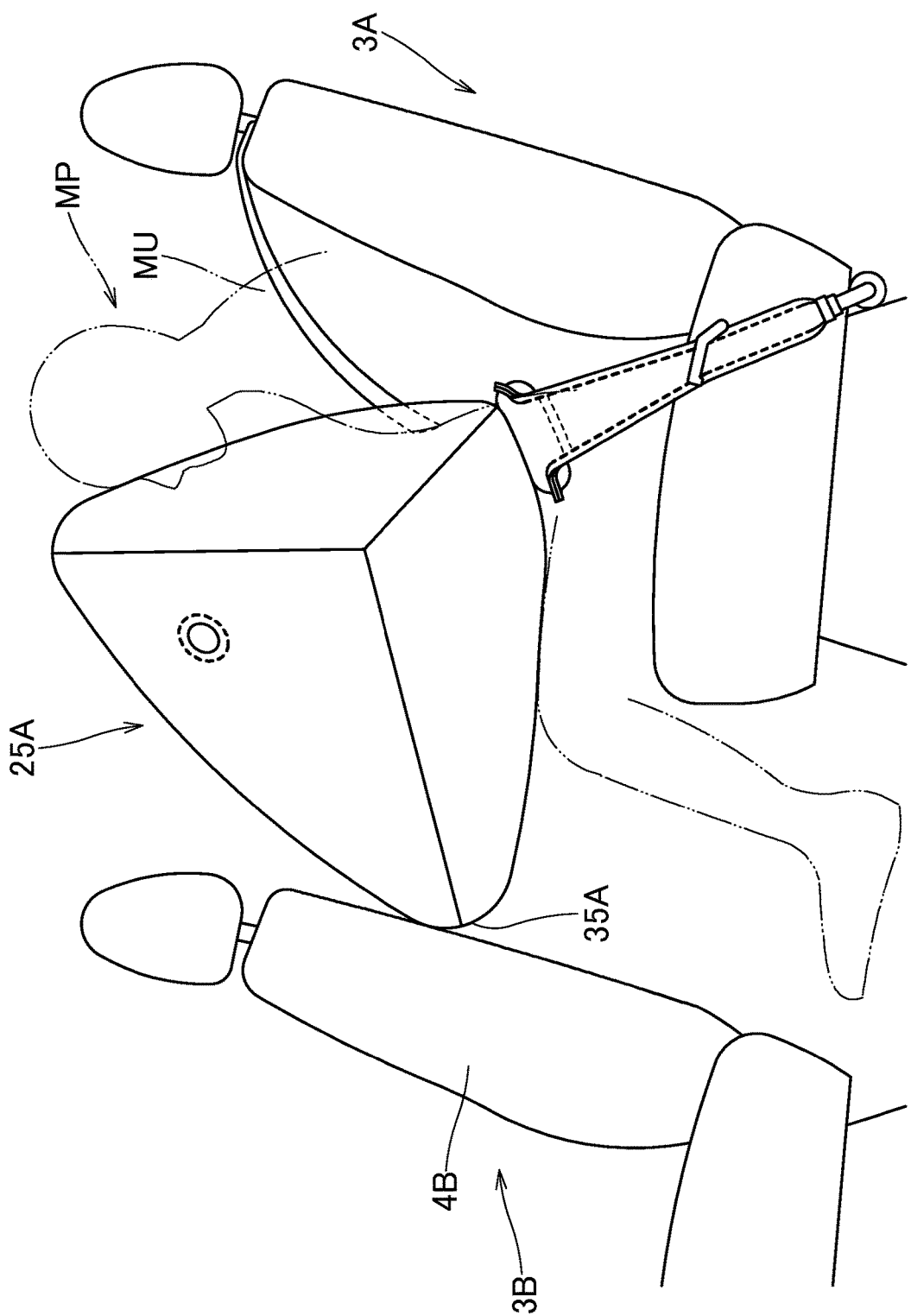
FIG. 10 is a side view illustrating a state where the occupant is restrained by the airbag that completed inflation in the occupant protection device of FIG. 9.

In the embodiment, the occupant protection device S is installed on the seat 3 as a passenger seat in which the instrument panel 1 as a vehicle body side member is provided at the front, but the vehicle body side member is not limited to the instrument panel. For example, as illustrated in FIGS. 9 and 10, the occupant protection device is installed on a rear seat (seat) 3A, and an airbag 25A when inflation is completed may abut against a front seat 3B as the vehicle body side member. Even in the occupant protection device having such a configuration, when the airbag is completely inflated, the vehicle body side member abutting surface 35A of the airbag 25A abuts against a backrest portion 4B of the front seat 3B. Then, it is suppressed that the occupant MP comes into contact with the front seat 3B. Further, by making the vehicle body side member abutting surface 35A abut against the backrest portion 4B of the front seat 3B, it is also possible to ensure the reaction force of the airbag 25A when the occupant is restrained.

Figure 11:
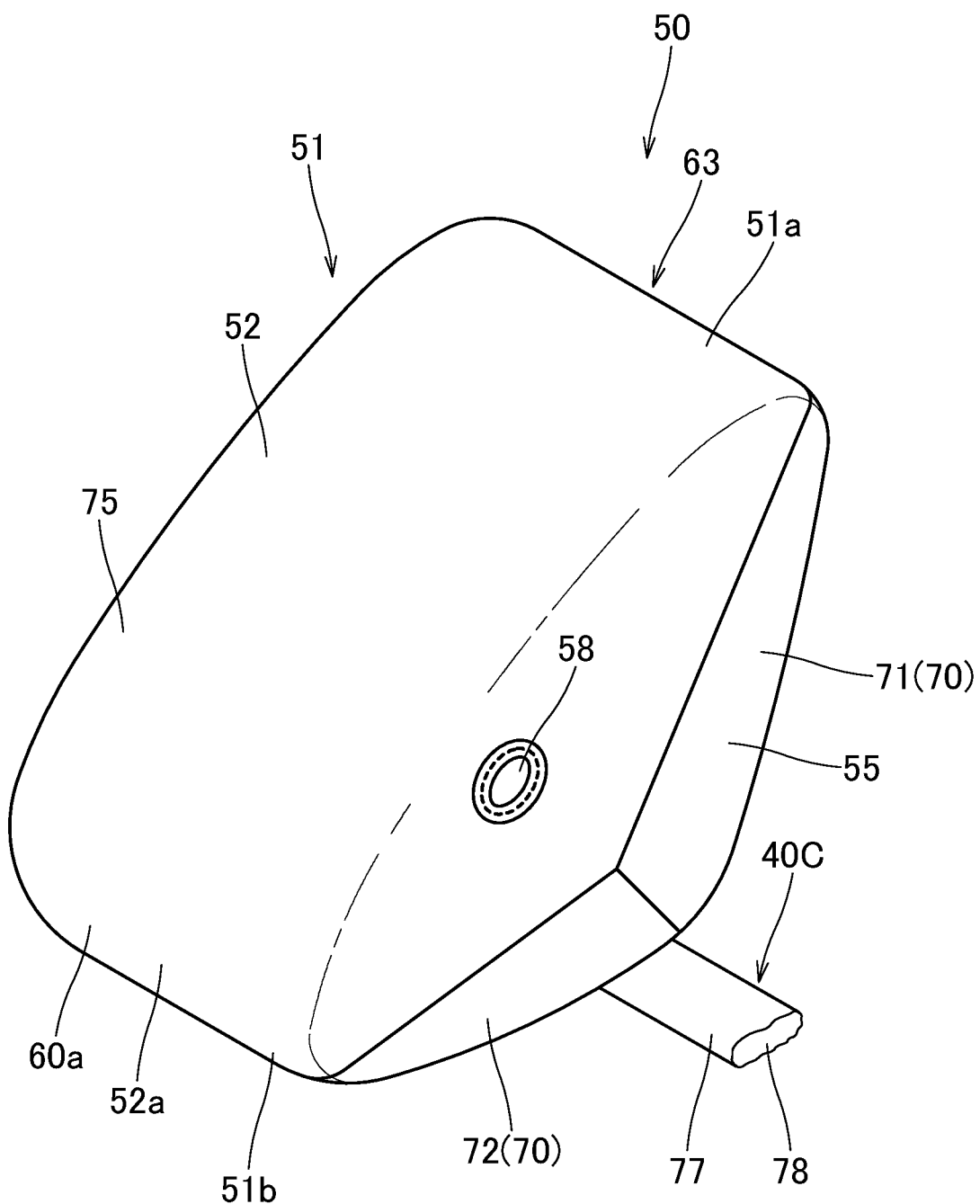
FIG. 11 is a schematic perspective view in a state where an airbag according to still another embodiment of the present disclosure is inflated singly.
Figure 12:
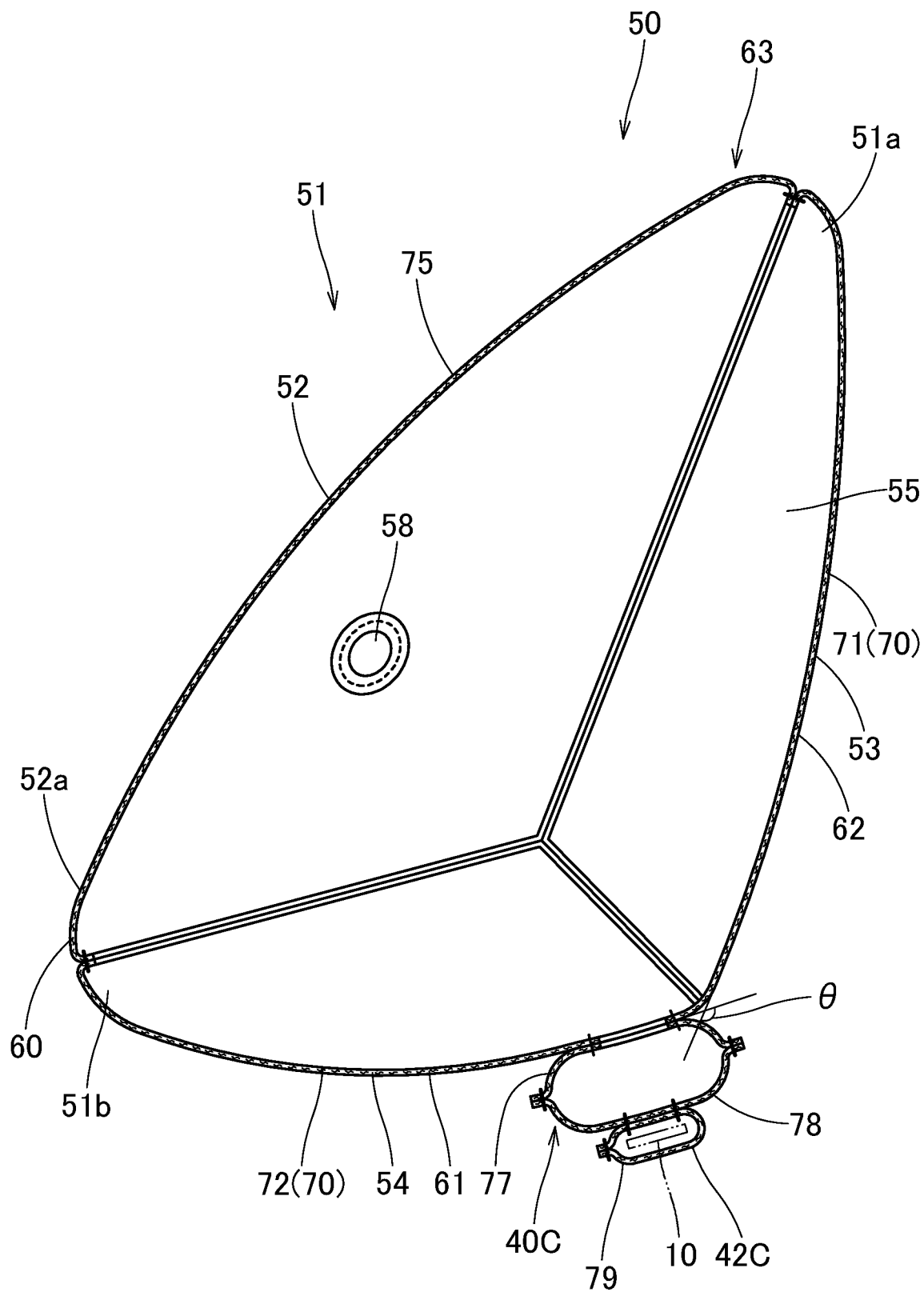
FIG. 12 is a schematic vertical sectional view of the airbag of FIG. 11.

As the airbag 50, those having the configurations illustrated in FIGS. 11 and 12 may be used. The airbag 50 includes a bag main body 51, a conduit portion 40C which is connected to an inflator (not illustrated) and allows the inflation gas to flow into the bag main body 51, and a belt attaching portion 42C for coupling the bag main body 51 to the wrap belt 10. Since the conduit portion 40C and the belt attaching portion 42C have the same configuration as those of the conduit portion 40 and the belt attaching portion 42 in the above-described airbag 25, "C" is added to the end of the same reference numbers, and the detailed description thereof will be omitted.

The external shape of the bag main body 51 when inflation is completed is a substantially triangular prism shape in which the axial direction is substantially along the left-right direction, as illustrated in FIGS. 11 and 12. Similar to the above-described bag main body 26, the bag main body 51 has a front wall 52 disposed on the front side away from the occupant MP when inflation is completed, a rear wall 53 and a lower wall 54 which are arranged on the occupant MP side when inflation is completed, and a left wall 55 and a right wall 56 which are arranged to face each other in the left-right direction when inflation is completed. Even in the bag main body 51, similar to the above-described bag main body 26, the part on the front surface lower end side (lower end 52a side of the front wall 52) of the bag main body 51 when inflation is completed forms the vehicle body side member abutting surface 60. Further, even in the bag main body 51, the lower wall 54 forms a femur abutting surface 61 capable of abutting against the femoral region MT of the occupant MP when inflation is completed, and the rear wall 53 forms an upper body restraining surface 62 capable of restraining the upper body MU of the occupant MP when inflation is completed.

Figure 16:
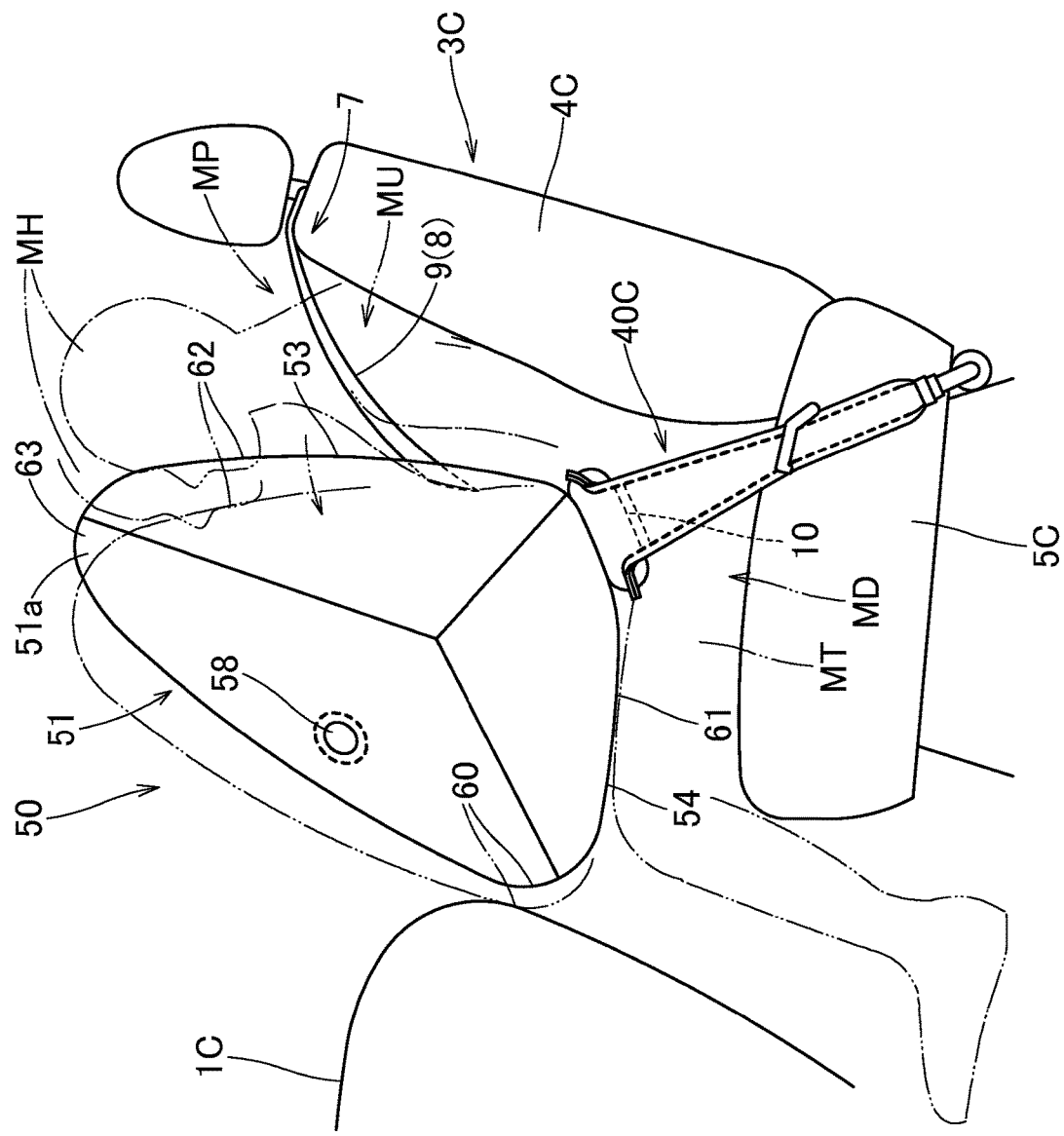
FIG. 16 is a side view of the seat in a state where inflation of the airbag is completed in the occupant protection device using the airbag of FIG. 11.

In the bag main body 51 (airbag 50), as illustrated in FIG. 12, in a state of being inflated singly, an intersection angle θ between the lower wall 54 (femur abutting surface 61) and the rear wall 53 (upper body restraining surface 62) is set within the range of 90° to 150°. Specifically, the intersection angle θ (specifically, the intersection angle between the tangents of the lower wall 54 and the rear wall 53, refer to FIG. 12) between the lower wall 54 and the rear wall 53 in the cross section substantially along the front-rear direction in a state of being inflated singly is set to approximately 120°. In the bag main body 51 (airbag 50) held by the seat belt 7, and when inflation is completed in a state where the occupant MP seated on the seat 3 is restrained by the seat belt 7, the rear wall 53 is disposed to be close to the lower wall 54 (such that the intersection angle is reduced) (refer to FIG. 16). Then, in a state where the inflation is completed to cover the front of the occupant MP, the width dimension of the bag main body 51 (airbag 50) is as follows. As illustrated in FIG. 16, the width dimension of the bag main body 51 (airbag 50) on the rear end side (rear wall 53 side) in the up-down direction is formed such that the upper end 51a is positioned in front of the head MH and the upper body MU of the occupant MP can be restrained from the chest MB to the head MH by the bag main body 51. The width dimension of the bag main body 51 (airbag 50) on the lower end side (lower wall 54 side) in the front-rear direction is formed such that the front lower end part 51b, which is on the front lower end side when inflation is completed, is disposed at a position slightly in front of the knee MK, substantially equivalent to the knee MK of the occupant MR In the airbag 50 of the embodiment, in the bag main body 51, the region on the upper end 51a side when inflation is completed forms a head protecting portion 63 capable of protecting the head MH of the occupant MR Further, in the airbag 50, the front lower end part 51b when inflation is completed is disposed at a position substantially equivalent to the knee MK of the occupant MP. However, in a state where the upper body MU of the occupant MP moving diagonally forward is restrained by the upper body restraining surface 62, the airbag 50 makes the vehicle body side member abutting surface 60 formed of the front surface (the lower end 52a of the front wall 52) of the front lower end part 51b abut against the instrument panel 1C at a position in front of the knee MK (refer to FIG. 16). Even in this airbag 50, although the detailed description is omitted, the width dimension of the bag main body 51 in the left-right direction when inflation is completed is formed to be substantially the same as that of the upper body MU of the occupant, similar to the above-described bag main body 26.

The airbag 50 is formed in a bag shape by joining the circumferential edges of the base member to each other as illustrated in FIG. 13. Specifically, as illustrated in FIGS. 11 to 13, the airbag 50 includes an occupant side panel 70 and a front panel 75 which form the bag main body 51, two conduit portion panels 77 and 78 which form the conduit portion 40C, and a belt attaching panel 79 that forms the belt attaching portion 42C. The occupant side panel 70, the front panel 75, the conduit portion panels 77 and 78, and the belt attaching panel 79 are respectively made of a flexible woven fabric made of polyester yarn, polyamide yarn, or the like.

The occupant side panel 70 is disposed on the occupant MP side when inflation is completed, and forms a part from the femur abutting surface 61 to the upper body restraining surface 62. The occupant side panel 70 includes a rear wall configuration portion 71 that mainly forms the rear wall 53, and a lower wall configuration portion 72 that mainly forms the lower wall 54, and the rear wall configuration portion 71 and the lower wall configuration portion 72 have an external shape to be coupled to each other on the rear lower end side when inflation is completed. The rear wall configuration portion 71 forms the rear wall 53, a region on the rear side in the left wall 55, and a region on the rear side in the right wall 56. The lower wall configuration portion 72 forms the lower wall 54, a region on the lower side in the left wall 55, and a region on the lower side in the right wall 56. The rear wall configuration portion 71 and the lower wall configuration portion 72 respectively have a substantially hexagonal external shape. The front panel 75 mainly forms the front wall 52 of the bag main body 51 when inflation is completed, and more specifically, forms the front wall 52, a region on the front side in the left wall 55, and a region on the front side in the right wall 56. The external shape of the front panel 75 is substantially hexagonal. Specifically, the external shape of the front panel 75 is a substantially hexagonal shape that substantially matches the rear wall configuration portion 71 and the lower wall configuration portion 72 in a state of being expanded flat to separate the remaining outer edges 71c and 72c from each other, in a state where a lower left edge 71a and a rear left edge 72a are joined to each other and a lower right edge 71b and a rear right edge 72b are joined to each other. The occupant side panel 70 and the front panel 75 are symmetrical in the left-right direction. The bag main body 51 has a bag shape by joining the outer edges 71c and 72c at an outer circumferential edge 75a of the front panel 75 in the occupant side panel 70 (rear wall configuration portion 71, lower wall configuration portion 72) in which the lower left edge 71a and the rear left edge 72a are joined to each other and the lower right edge 71b and the rear right edge 72b are joined to each other.

The two conduit portion panels 77 and 78 have the same external shape, and respectively form a region on the upper side and a region on the lower side in the conduit portion 40C. The external shape of the belt attaching panel 79 is a substantially rectangular plate shape, and by folding the belt attaching panel in half and joining the edge portions in the lateral direction to each other, the belt attaching portion 42C is formed.

Then, in the bag main body 51 (airbag 50) of the embodiment, in a state of being inflated singly, the intersection angle θ (refer to FIG. 12) between the lower wall 54 (femur abutting surface 61) and the rear wall 53 (upper body restraining surface 62) can be appropriately set by changing an inclination angle of the lower left edge 71a and the lower right edge 71b in the rear wall configuration portion 71 of the occupant side panel 70, specifically, an inclination angle α (refer to FIG. 13) with respect to the center line (center line C along the front-rear direction passing through the center in the left-right direction) of the rear wall configuration portion 64. When this inclination angle α is set large, the intersection angle θ between the lower wall 54 and the rear wall 53 in a state of being inflated singly can be increased. Specifically, in the occupant side panel 70 that forms the airbag 50 (bag main body 51) of the embodiment, the inclination angle α is set to approximately 75°. Although not illustrated in detail, the bag main body 26 in the above-described airbag 25 is also formed in a bag shape by joining the circumferential edges of a base member having the same shape to each other, and the inclination angle of the lower left edge and the lower right edge of the rear wall configuration portion is set to be smaller than the inclination angle α of the lower left edge and the lower right edge of the rear wall configuration portion that forms the bag main body 51.

Figure 14A:
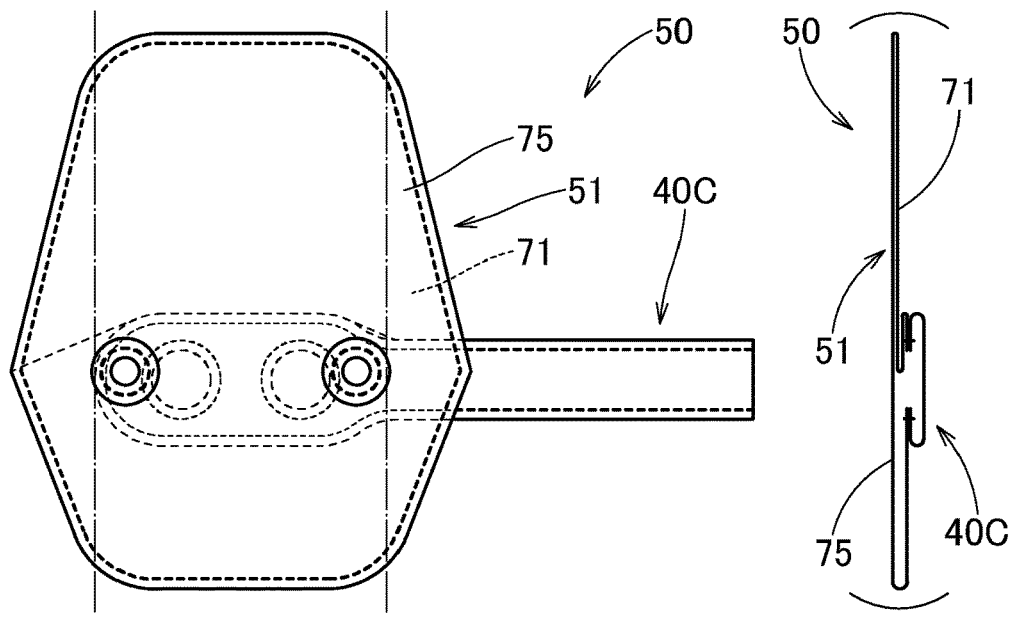
FIG. 14A is a schematic view describing a folding process of the airbag of FIG. 11.
Figure 14B:
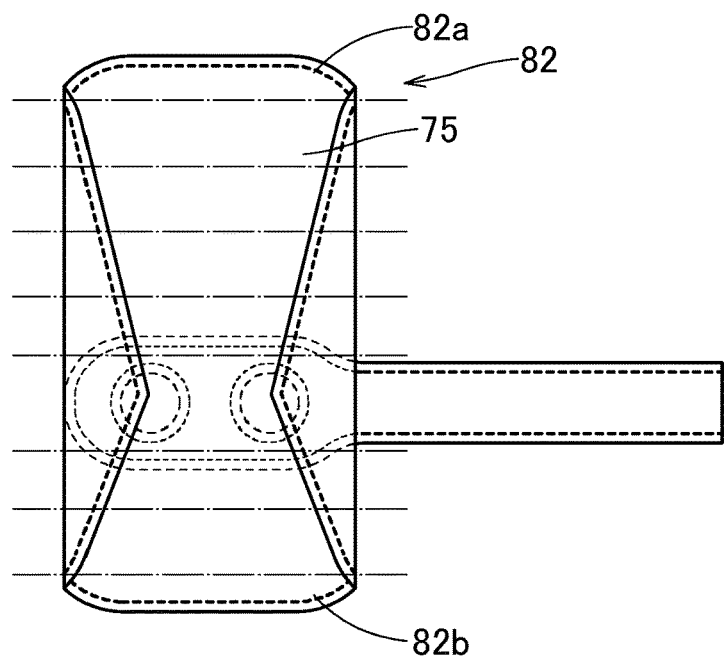
FIG. 14B is a schematic view further describing the folding process of the airbag of FIG. 11.
Figure 14C:
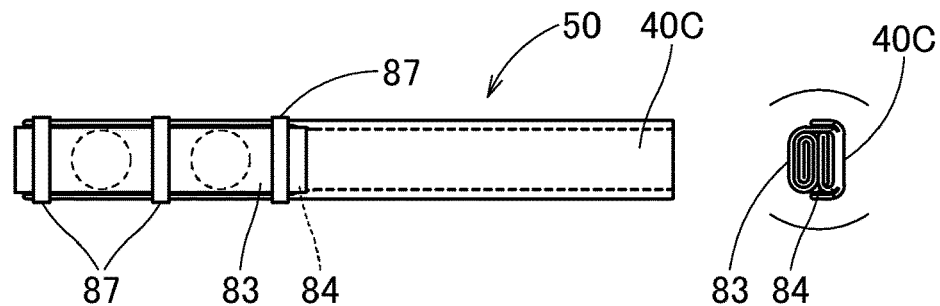
FIG. 14C is a schematic view further describing the folding process of the airbag of FIG. 11.
Figure 15A:
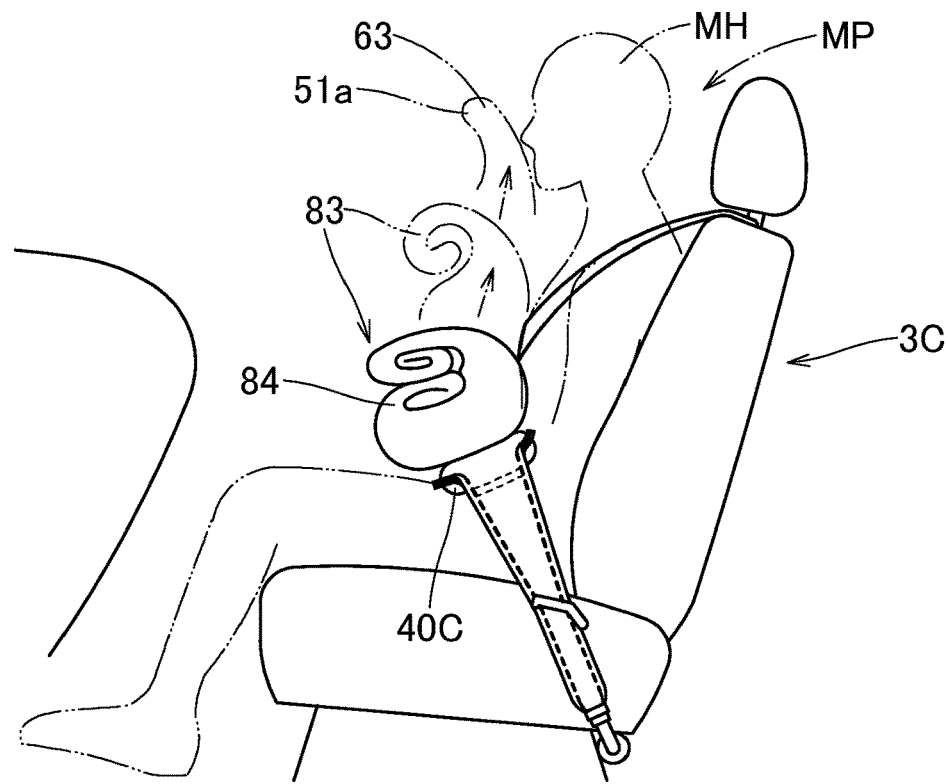
FIG. 15A is a schematic view illustrating an inflation process of the airbag of FIG. 11.
Figure 15B:
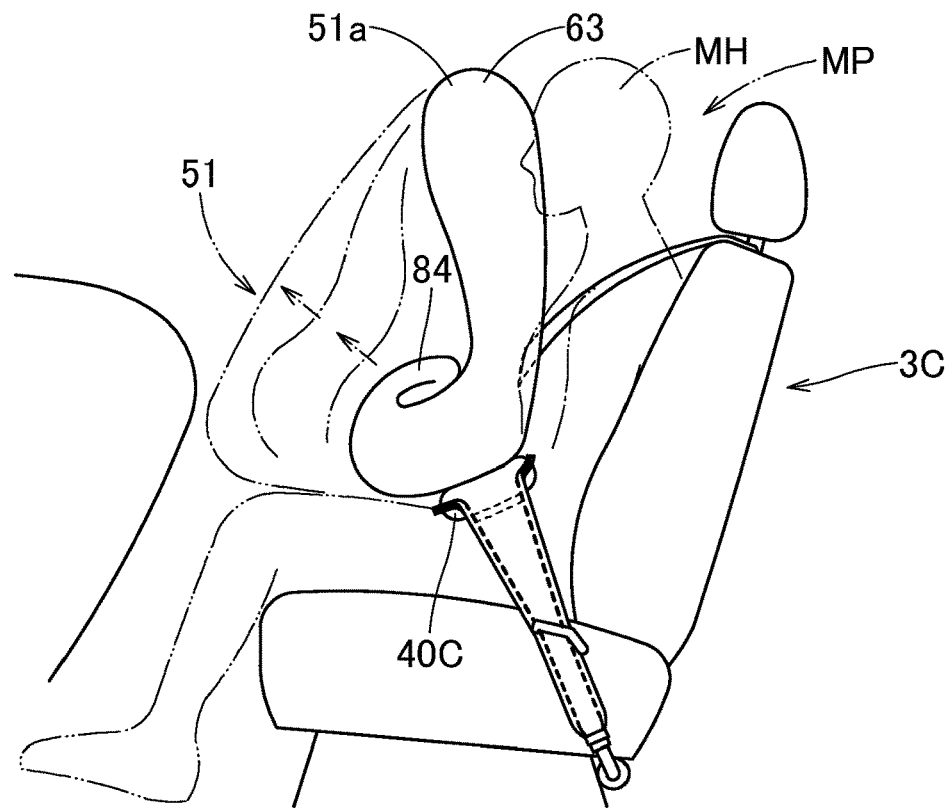
FIG. 15B is a schematic view further illustrating the inflation process of the airbag of FIG. 11.

Further, the airbag 50 is folded as illustrated in FIGS. 14A-14C and installed on the seat 3C. Specifically, as illustrated in FIGS. 14A and 14B, in the bag main body 51, a left-right reduced folding bag 82 of which the width dimension in the left-right direction is reduced is formed by folding back the left edge side and the right edge side respectively to the front panel 75 side (the side away from the occupant) from the state where the front panel 75 and the occupant side panel 70 are overlapped with each other such that the front panel 75 is expanded flat. After this, as illustrated in 14B and 14C, by roll-folding the left-right reduced folding bag 82 to roll from each of the upper edge 82a side and the lower edge 82b side toward the front panel 75, an upper roll folding part 83 and a lower roll folding part 84 are formed. Next, the bag main body 51 can be folded by overlapping the lower roll folding part 84 on the conduit portion 40C and overlapping the upper roll folding part 83 on the lower roll folding part 84. Then, the airbag 50 (bag main body 51) folded in this manner maintains a folded state by wrapping a breakable tape material 87 for preventing collapse around a predetermined position as illustrated in FIG. 14C. The folded airbag 50 (bag main body 51) is disposed in the region of the wrap belt 10 while covering the surrounding with a cover together with the wrap belt 10 and being held by the wrap belt 10, in the same manner as that of the above-described airbag 25.

Even when the airbag 50 having such a configuration is used, the airbag 50 (bag main body 51) has the vehicle body side member abutting surface 60 capable of abutting against the instrument panel 1C as a vehicle body side member disposed in front of the seat 3C. Therefore, as illustrated in FIG. 16, even when the occupant MP moves slightly forward with respect to the seat 3C when an impact force is applied to the seat 3C from the front during the actuation, the vehicle body side member abutting surface 60 of the airbag 50 abuts against the rear surface 1b of the instrument panel 1C, and contact of the occupant MP with the instrument panel 1C can be suppressed. Further, the airbag 50 can ensure the reaction force when the occupant is restrained by making the vehicle body side member abutting surface 60 abut against the rear surface 1b of the instrument panel 1C. Therefore, when the occupant MP moves such that the upper body MU moves diagonally forward, the forward movement stroke of the upper body restraining surface 62 can be suppressed to increase the energy absorption amount, and the upper body MU of the occupant MP can be stably received and protected by the upper body restraining surface 62.

Further, in the airbag 50 having the above-described configuration, the head protecting portion 63 capable of protecting the head MH of the occupant MP is provided on the upper end 51a side when inflation is completed. Furthermore, in the airbag 50, in a state of being inflated singly, the intersection angle θ between the upper body restraining surface 62 (rear wall 53) and the femur abutting surface 61 (lower wall 54) is set within the range of 90° to 150° (approximately 120° in the case of the embodiment). Therefore, in the airbag 50 having the above-described configuration, the head protecting portion 63 can be rapidly inflated toward the head MH of the occupant MP as compared with a case where the intersection angle between the upper body restraining surface and the femur abutting surface is set to less than 90°. Further, in addition to this, in the folding process, the airbag 50 is roll-folded and folded to be rolled toward the front wall 52 (front panel 75) while bringing the upper end 51a side, which is the head protecting portion 63 side, closer to the conduit portion 40C side. Therefore, the airbag 50 (bag main body 51) allows the inflation gas to flow thereinto, and protrudes forward and upward from the wrap belt 10. Then, the inflation gas that flows into the inside of the bag main body 51 can flow diagonally backward and upward to be substantially along the upper body restraining surface 62 (rear wall 53). Then, the head protecting portion 63 can be rapidly inflated toward the head MH of the occupant MP. Therefore, the head MH of the occupant MP can be rapidly restrained by the head protecting portion 63.

Describing a state where the airbag 50 is expanded in detail, when the inflation gas flows thereinto through the conduit portion 40C, the bag main body 51 first protrudes forward and upward from the wrap belt 10. After this, the bag main body 51 expands and inflates to unfold the upper roll folding part 83 and the lower roll folding part 84. Specifically, as illustrated in 15A, while unfolding the upper roll folding part 83 by the inflation gas that flows into the bag main body 51 to be substantially along the upper body restraining surface 62 (rear wall 53), the bag main body 51 first expands toward the rear diagonally upward (the head MH side of the occupant MP), and the head protecting portion 63 of the tip end side (upper end 51a) is rapidly expanded to reach the front surface of the head MH. Then, as illustrated in 15B, the entire airbag is inflated to be thick while unfolding the lower roll folding part 84.

Figure 18A:
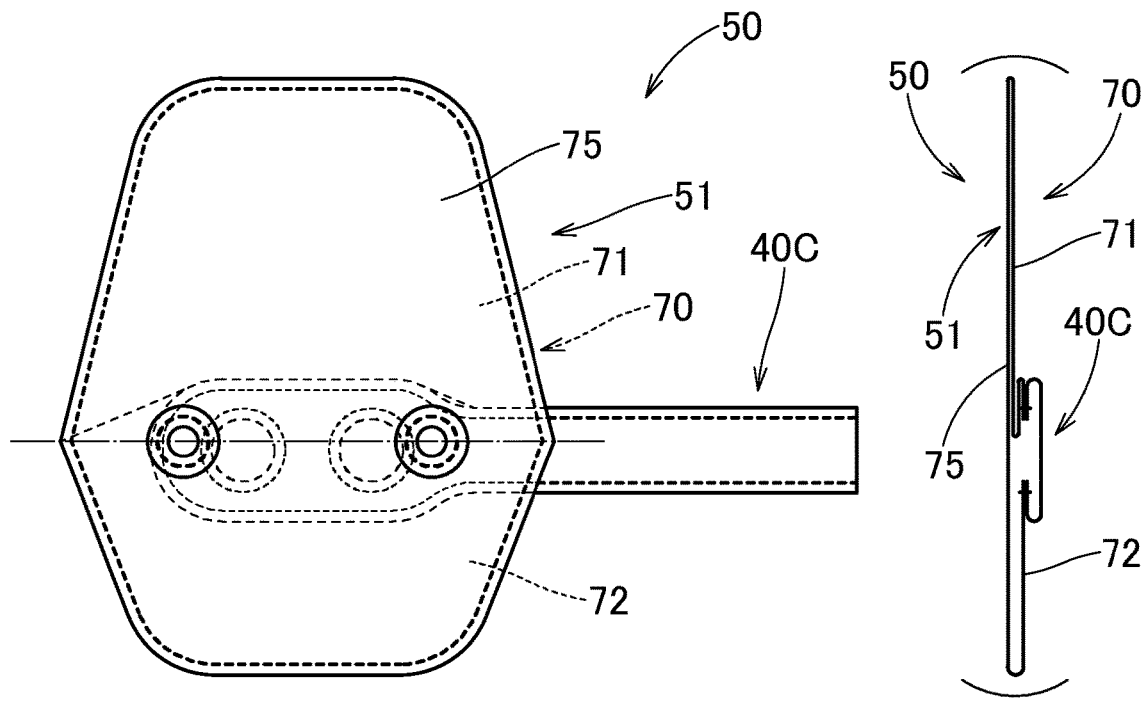
FIG. 18A is a schematic view describing a second folding process of the airbag of FIG. 11.
Figure 18B:
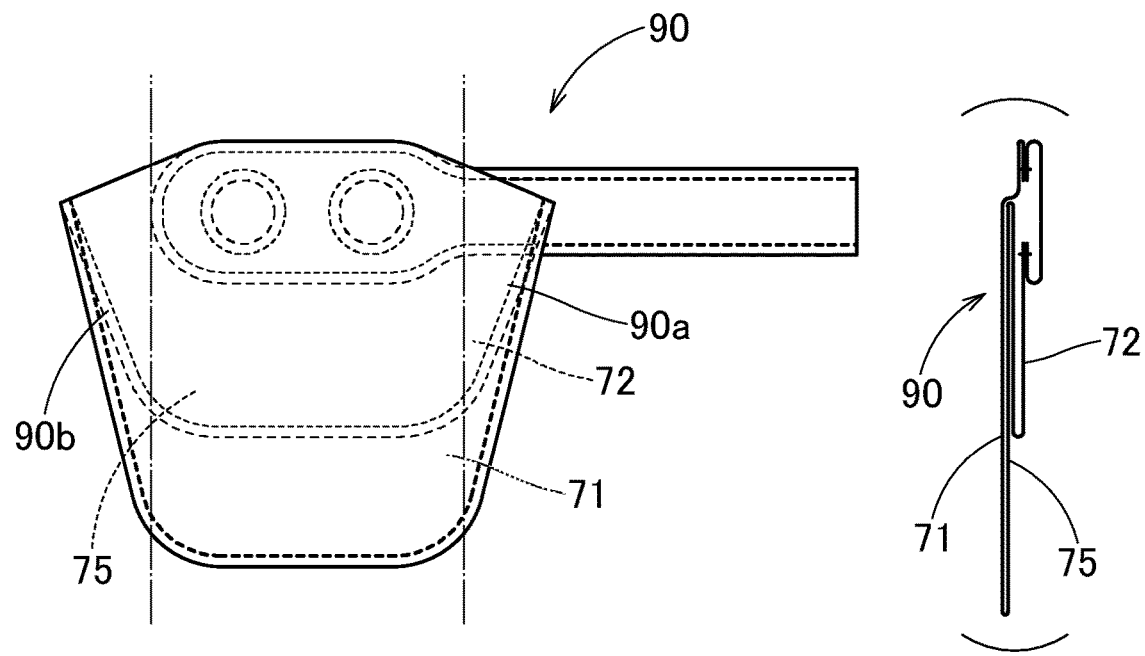
FIG. 18B is a schematic view further describing the second folding process of the airbag of FIG. 11.
Figure 19A:
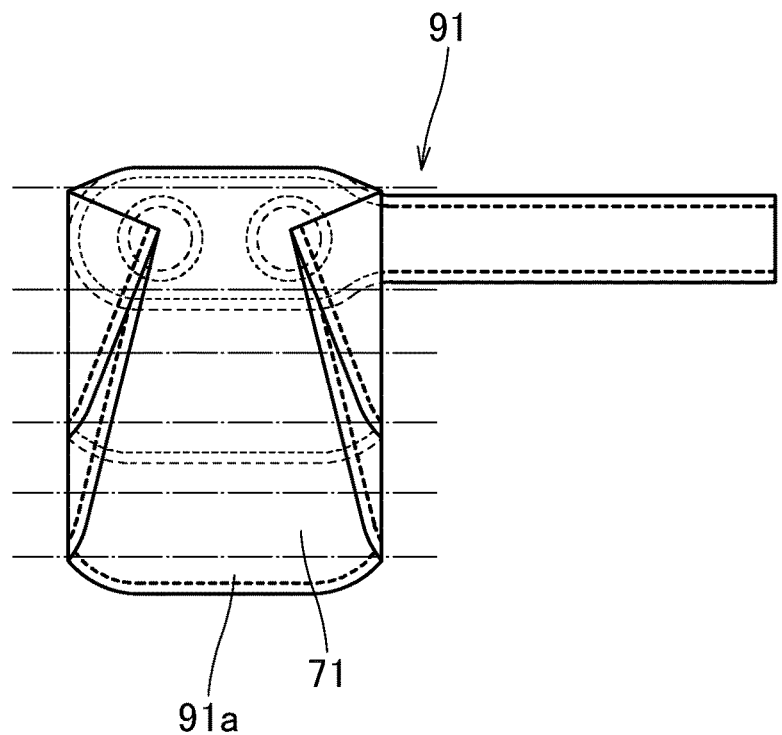
FIG. 19A is a schematic view describing the second folding process of the airbag of FIG. 11.
Figure 19B:
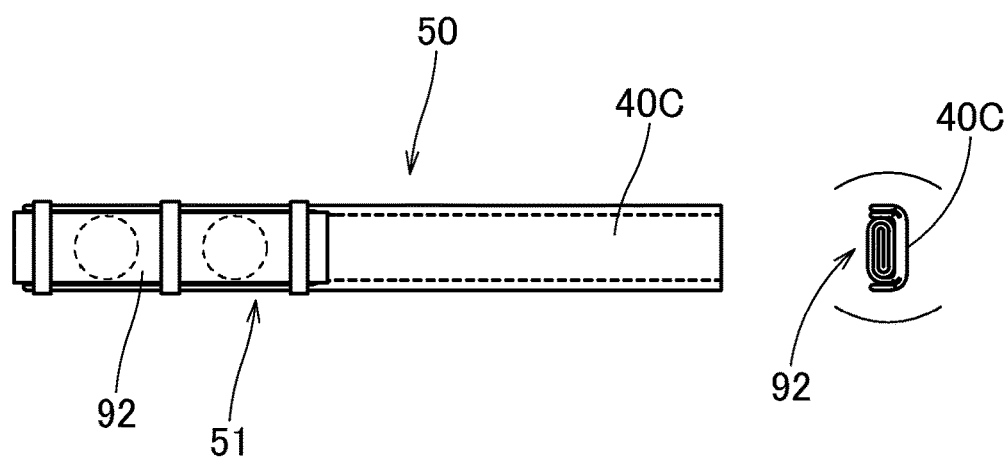
FIG. 19B is a schematic view further describing the second folding process of the airbag of FIG. 11.
Figure 20A:
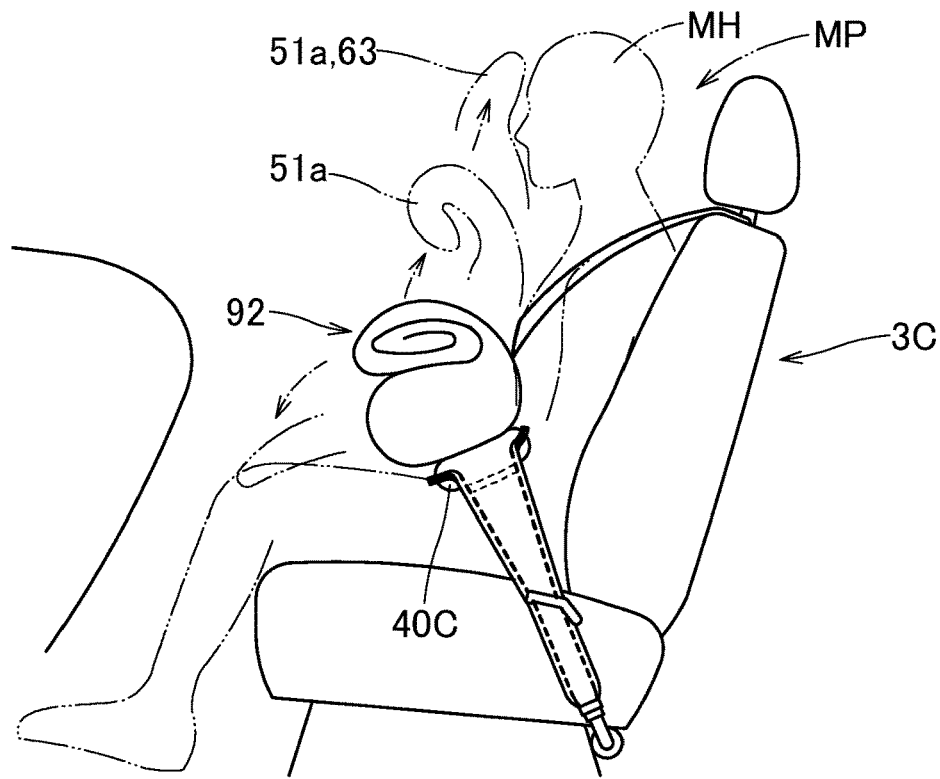
FIG. 20A is a schematic view describing an inflation process when the airbag of FIG. 11 is folded in the folding process as illustrated in FIGS. 18A-18B and 19A-19B.
Figure 20B:
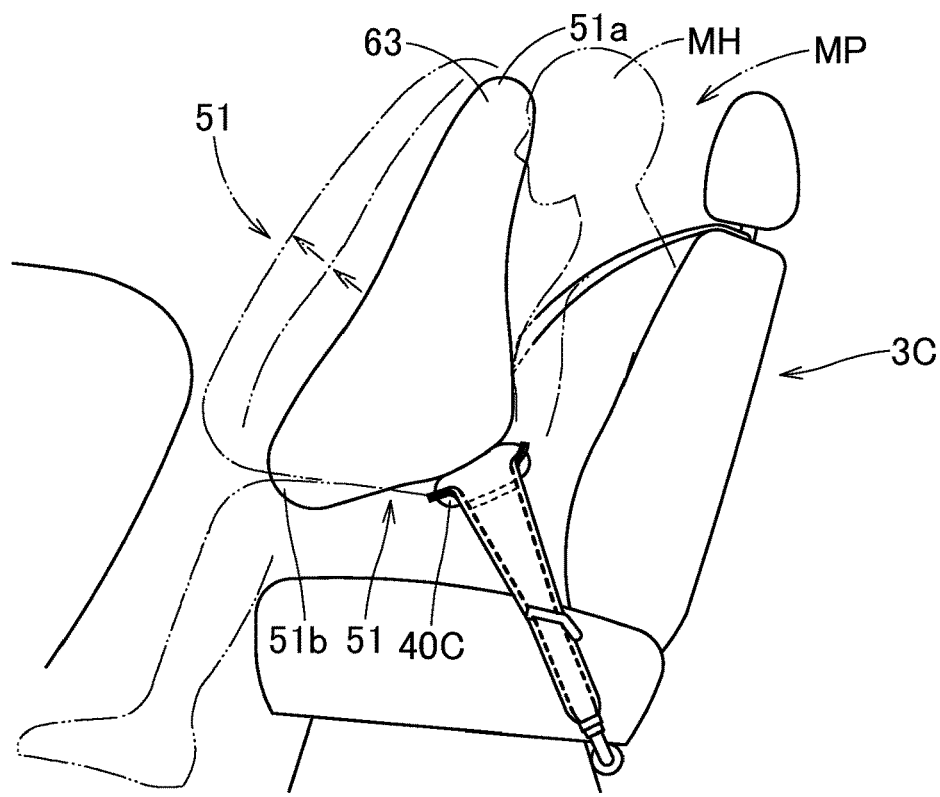
FIG. 20B is a schematic view describing the inflation process when the airbag of FIG. 11 is folded in the folding process as illustrated in FIGS. 18A-18B and 19A-19B.

Further, the airbag 50 may be configured to be folded by folding as illustrated in FIGS. 18A-18B and 19A-19B. Specifically, as illustrated in FIGS. 18A and 18B, the bag main body 51 in a state where the front panel 75 and the occupant side panel 70 are overlapped on each other to expand the front panel 75 flat is folded substantially in half such that the rear wall configuration portion 71 is overlapped on the lower wall configuration portion 72 side, and the inner sides of the front panel 75 are overlapped on each other in the occupant side panel 70. Then, the left edge 90a side and a right edge 90b side of the bag 90 folded in half are respectively folded back toward the rear wall configuration portion 71 side to form the left-right reduced folding bag 91 as illustrated in FIG. 19A. After this, as illustrated in FIGS. 19A and 19B, the left-right reduced folding bag 91 is roll-folded to be rolled from the lower edge 91a side toward the rear wall configuration portion 71, and can fold the bag main body 51 to form a roll folding part 92. When the airbag 50 is folded in this manner, the bag main body 51 allows the inflation gas to flow thereinto through the conduit portion 40C, protrudes forward and upward from the wrap belt 10, expands widely in the up-down direction while unfolding the roll folding part 90, and then inflates the entire airbag to be thick (refer to FIGS. 20A and 20B). Therefore, similar to a case of folding as described above, the bag main body 51 is expanded such that the head protecting portion 63 on the upper end 51a side rapidly reaches the front surface of the head M H.

Figure 17:
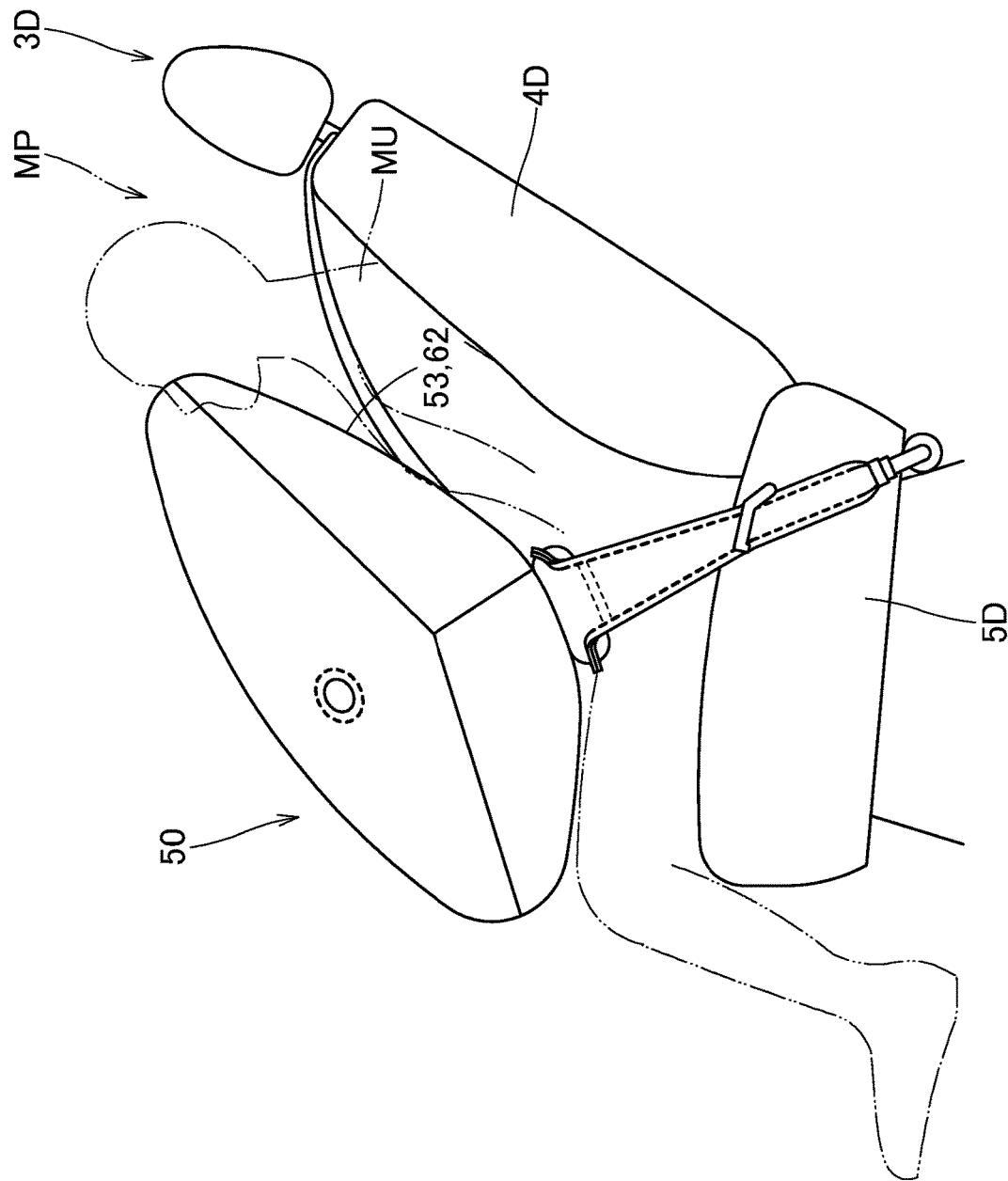
FIG. 17 is a side view of the seat illustrating a state where the airbag of FIG. 11 is inflated in the reclining seat.

In addition, in the airbag 50, in a state of being inflated singly, the intersection angle θ between the upper body restraining surface 62 (rear wall 53) and the femur abutting surface 61 (lower wall 54) is set within the range of 90° to 150° (approximately 120° in the case of the embodiment). Therefore, as illustrated in FIG. 17, even when the airbag 50 is inflated to cover the front of the occupant MP seated on the seat 3D reclining a backrest portion 4D to be inclined rearward with respect to the seat portion 5D, the rear wall 53 (upper body restraining surface 62) can be disposed to be substantially along the upper body MU of the occupant MR Then, the occupant MP seated on the reclining seat 3D can be accurately protected by the airbag 50. Therefore, as long as the airbag 50 is employed in which the intersection angle between the upper body restraining surface 62 (rear wall 53) and the femur abutting surface 61 (lower wall 54) in a state of being inflated singly is within the range of 90° to 150°, for example, a seat of a vehicle that supports automatic driving is also suitable. In this case, even in a state where the vehicle body side member is not disposed at the front, the occupant seated on the reclining seat can be suitably protected during automatic driving or the like.

Furthermore, in the occupant protection device S of the embodiment, the wrap belt 10 of the seat belt 7 is used as the holding belt portion for holding the airbag 25. However, instead of using the wrap belt, a holding belt portion separated from the seat belt may be provided, and the holding belt portion may hold the airbag. In the occupant protection device S of the embodiment, the airbag 25 is held by the wrap belt 10 of the seat belt 7, but the inflator 17 is actuated later than the actuation of the pretensioner mechanism of the seat belt 7 (approximately 5 ms). Therefore, the airbag 25 can be inflated in a state where the seat belt 7 stably maintains the seating state of the occupant MP on the seat 3, and the airbag 25 and the seat belt 7 can stably protect the occupant MP.

The present disclosure relates to an occupant protection device having the following configuration.

There is provided an occupant protection device for protecting an occupant seated on a seat, including: an airbag folded and accommodated in a bag shape made of a flexible sheet material; and a holding belt portion that is wrapped around a hip of the occupant and holds the folded airbag, in which the airbag is configured to, when the airbag is activated, allow an inflation gas to flow thereinto, and inflate to protrude forward and upward from the holding belt portion, and includes an upper body restraining surface capable of restraining an upper body of the occupant, on a rear surface side, when inflation is completed, and a vehicle body side member abutting surface that abuts against a vehicle body side member provided in front of the seat to be capable of ensuring a reaction force of the airbag when the occupant is restrained, on a front surface side.

In the occupant protection device of the present disclosure, since the airbag includes the vehicle body side member abutting surface that can abut against the vehicle body side member provided in front of the seat, and thus, even when the occupant moves slightly forward with respect to the seat when an impact force is applied to the seat from the front during the actuation, the vehicle body side member abutting surface of the airbag abuts against the vehicle body side member. Therefore, it is possible to suppress a case where the occupant comes into contact with the vehicle body side member. In addition, since the airbag can ensure the reaction force when the occupant is restrained by making the vehicle body side member abutting surface abut against the vehicle body side member, when the upper body of the occupant moves diagonally forward, it is possible to suppress the movement stroke to the front of the upper body restraining surface and increase the energy absorption amount. Therefore, the upper body restraining surface can stably receive and protect the upper body of the occupant.

Therefore, in the occupant protection device of the embodiment, even when the vehicle body side member is provided in front of the seat, contact with the vehicle body side member can be suppressed to accurately protect the occupant.

In the occupant protection device of the present disclosure, it is preferable that the airbag include a femur abutting surface capable of abutting against a femoral region of the occupant, on a lower surface side when inflation is completed, and the vehicle body side member abutting surface be configured to be provided on a lower end side of the airbag when inflation is completed, and be capable of abutting against the vehicle body side member at a position in front of a knee of the occupant.

In the occupant protection device having the above-described configuration, the airbag can make the femur abutting surface on the lower surface side abut against the upper surface of the femoral region of the occupant when the upper body is restrained by the upper body restraining surface. Therefore, the upper body of the occupant can be more accurately restrained by the upper body restraining surface while the collapse or compression of the airbag is suppressed. Further, in the occupant protection device having the above-described configuration, the vehicle body side member abutting surface is configured to be capable of abutting against the vehicle body side member at a position on the lower end side of the airbag and at a position in front of the knee of the occupant, and thus, it is possible to suppress a case where the knee of the occupant interferes with the vehicle body side member.

Furthermore, a case where the airbag is provided with the knee protecting portion disposed to cover the front of the knee when the vehicle body side member abutting surface abuts against the vehicle body side member, is preferable because it is possible to accurately suppress a case where the knee of the occupant interferes with the vehicle body side member.

Furthermore, in the occupant protection device having the above-described configuration, it is preferable that the airbag be configured to provide a head protecting portion capable of protecting a head of the occupant on an upper end side when inflation is completed, and set an intersection angle between the upper body restraining surface and the femur abutting surface within a range of 90° to 150° in a state of being inflated singly. When the airbag has the above-described configuration, the head protecting portion can be rapidly inflated to be closer to the head of the occupant as compared with a case where the intersection angle between the upper body restraining surface and the femur abutting surface is set to less than 90°. Therefore, the head of the occupant can be rapidly restrained by the head protecting portion.

Furthermore, in the occupant protection device having the above-described configuration, it is preferable that the vent hole capable of exhausting an excess inflation gas that has flowed thereinto be formed at a position of a non-contact area when the airbag abuts against the vehicle body side member. When the airbag has the above-described configuration, when the airbag when inflation is completed makes the vehicle body side member abutting surface abut against the vehicle body side member, the inflation gas is appropriately exhausted from the vent hole, and accordingly, it is possible to suppress an excessive increase in internal pressure.

Specifically, it is preferable that the vent hole be provided on the front surface side or the side surface side of the airbag when inflation is completed. Furthermore, it is preferable that the vent hole be provided at a position equal to or higher than a position of a shoulder of the occupant. When the vent hole is disposed at a position equal to or higher than the position of the shoulder of the occupant, it is possible to suppress a case where the inflation gas exhausted from the vent hole hits the arm or the like of the occupant.

Specifically, it is preferable that, when vehicle body side member is the instrument panel, the vent hole be provided at a position higher than an upper surface of the instrument panel in the airbag when inflation is completed.

What is claimed is:

1. An occupant protection device for protecting an occupant seated on a seat of a vehicle, the occupant protection device comprising:
    an airbag folded and accommodated in a bag shape made of a flexible sheet material; and
    a holding belt portion that holds the folded airbag and is configured and adapted so as to be wrapped around a hip of the occupant, wherein
    the folded airbag is configured and adapted so as to be disposed in front of the hip of the occupant, and
    the airbag is configured to, when the airbag is activated, allow an inflation gas to flow thereinto, and inflate to protrude forward and upward from the holding belt portion, and includes an upper body restraining surface configured and adapted so as to restrain an upper body of the occupant, on a rear surface side, when inflation is completed, and a vehicle body side member abutting surface that is configured and adapted to abut against a vehicle body side member of the vehicle provided in front of the seat so as to be capable of ensuring a reaction force of the airbag when the occupant is restrained, on a front surface side of the airbag.

2. The occupant protection device according to claim 1, wherein
the airbag includes a femur abutting surface configured and adapted to abut against a femoral region of the occupant, on a lower surface side when inflation is completed, and
the vehicle body side member abutting surface is configured to be provided on a lower end side of the airbag when inflation is completed, and configured and adapted to abut against the vehicle body side member so as to be at a position in front of a knee of the occupant.

3. The occupant protection device according to claim 1, wherein
the airbag includes a knee protecting portion configured and adapted so as to be disposed to cover the front of the knee when the vehicle body side member abutting surface abuts against the vehicle body side member.

4. The occupant protection device according to claim 2, wherein
the airbag is configured to provide a head protecting portion configured and adapted to protect a head of the occupant on an upper end side of the airbag when inflation is completed, and sets an intersection angle between the upper body restraining surface and the femur abutting surface within a range of 90° to 150° in a state of being inflated singly.

5. The occupant protection device according to claim 1, wherein
the airbag includes a vent hole capable of exhausting an excess inflation gas that has flowed thereinto, and
the vent hole is formed so as to be at a position of a non-contact area when the airbag abuts against the vehicle body side member.

6. The occupant protection device according to claim 5, wherein
the vent hole is provided on the front surface side or a side surface side of the airbag when inflation is completed.

7. The occupant protection device according to claim 6, wherein
the vent hole is configured and adapted so as to be provided at a position equal to or higher than a position of a shoulder of the occupant in the airbag when inflation is completed.

8. The occupant protection device according to claim 5, wherein
the vehicle body side member is an instrument panel, and the vent hole is configured and adapted so as to be provided at a position higher than an upper surface of the instrument panel in the airbag when inflation is completed.

9. An occupant protection device for protecting an occupant seated on a seat of a vehicle, the occupant protection device comprising:
an airbag folded and accommodated in a bag shape made of a flexible sheet material; and
a holding belt portion that holds the folded airbag and is configured and adapted so as to be wrapped around a hip of the occupant, wherein
the airbag is configured to, when the airbag is activated, allow an inflation gas to flow thereinto, and inflate to protrude forward and upward from the holding belt portion, and includes an upper body restraining surface configured and adapted so as to restrain an upper body of the occupant, on a rear surface side, when inflation is completed, and a vehicle body side member abutting surface that is configured and adapted to abut against a vehicle body side member of the vehicle provided in front of the seat so as to be capable of ensuring a reaction force of the airbag when the occupant is restrained, on a front surface side of the airbag,
the airbag includes a femur abutting surface configured and adapted to abut against a femoral region of the occupant, on a lower surface side when inflation is completed, and
the vehicle body side member abutting surface is configured to be provided on a lower end side of the airbag when inflation is completed, and configured and adapted to abut against the vehicle body side member so as to be at a position in front of a knee of the occupant.

10. The occupant protection device according to claim 9, wherein
the airbag is configured to provide a head protecting portion configured and adapted to protect a head of the occupant on an upper end side of the airbag when inflation is completed, and sets an intersection angle between the upper body restraining surface and the femur abutting surface within a range of 90° to 150° in a state of being inflated singly.

11. The occupant protection device according to claim 9, wherein
the airbag includes a vent hole capable of exhausting an excess inflation gas that has flowed thereinto, and
the vent hole is formed so as to be at a position of a non-contact area when the airbag abuts against the vehicle body side member.

12. The occupant protection device according to claim 11, wherein
the vent hole is provided on the front surface side or a side surface side of the airbag when inflation is completed.

13. The occupant protection device according to claim 12, wherein
the vent hole is configured and adapted so as to be provided at a position equal to or higher than a position of a shoulder of the occupant in the airbag when inflation is completed.

14. The occupant protection device according to claim 11, wherein
the vehicle body side member is an instrument panel, and the vent hole is configured and adapted so as to be provided at a position higher than an upper surface of the instrument panel in the airbag when inflation is completed.

* * * * *